United States Patent Office 3,424,859
Patented Jan. 28, 1969

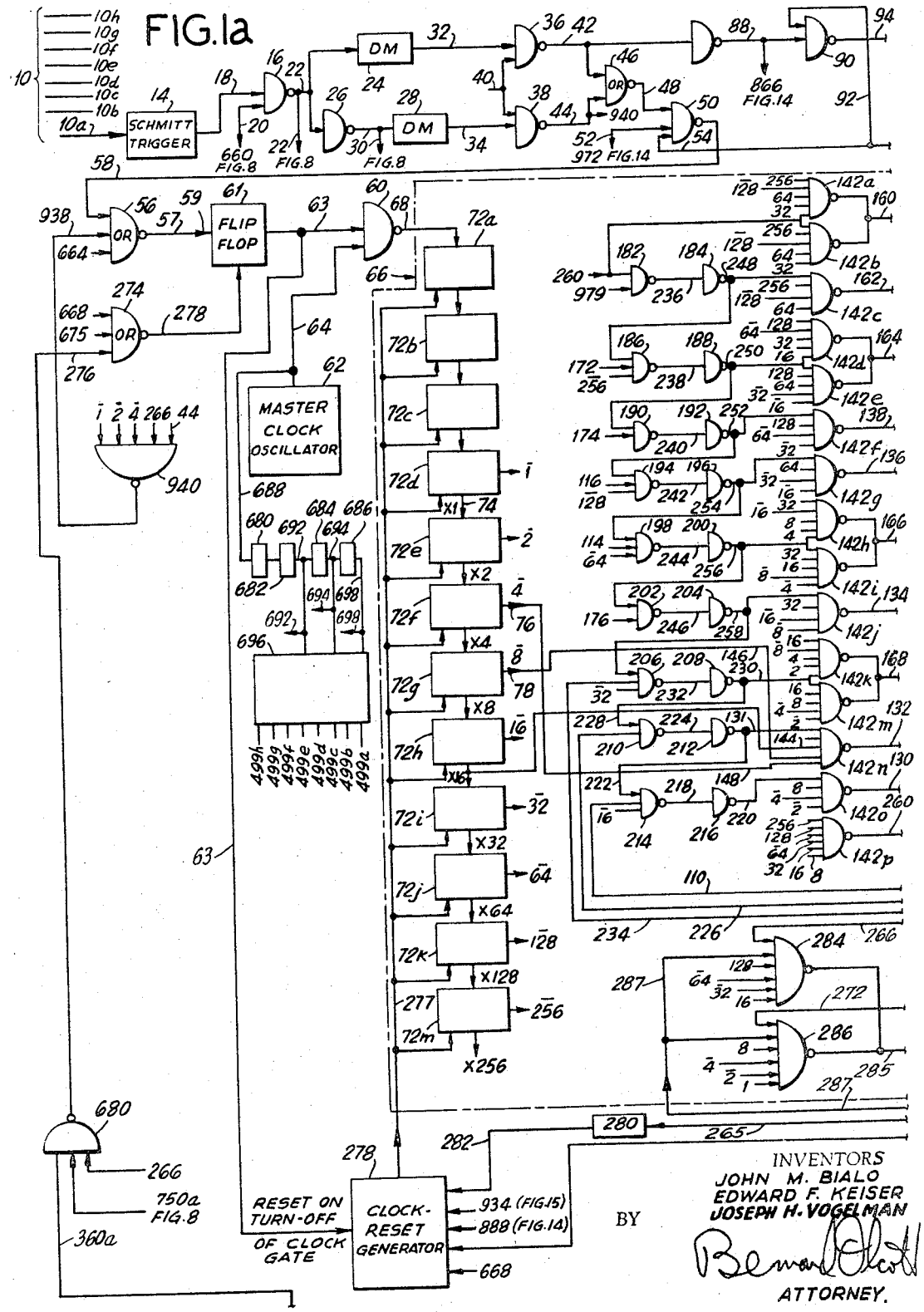

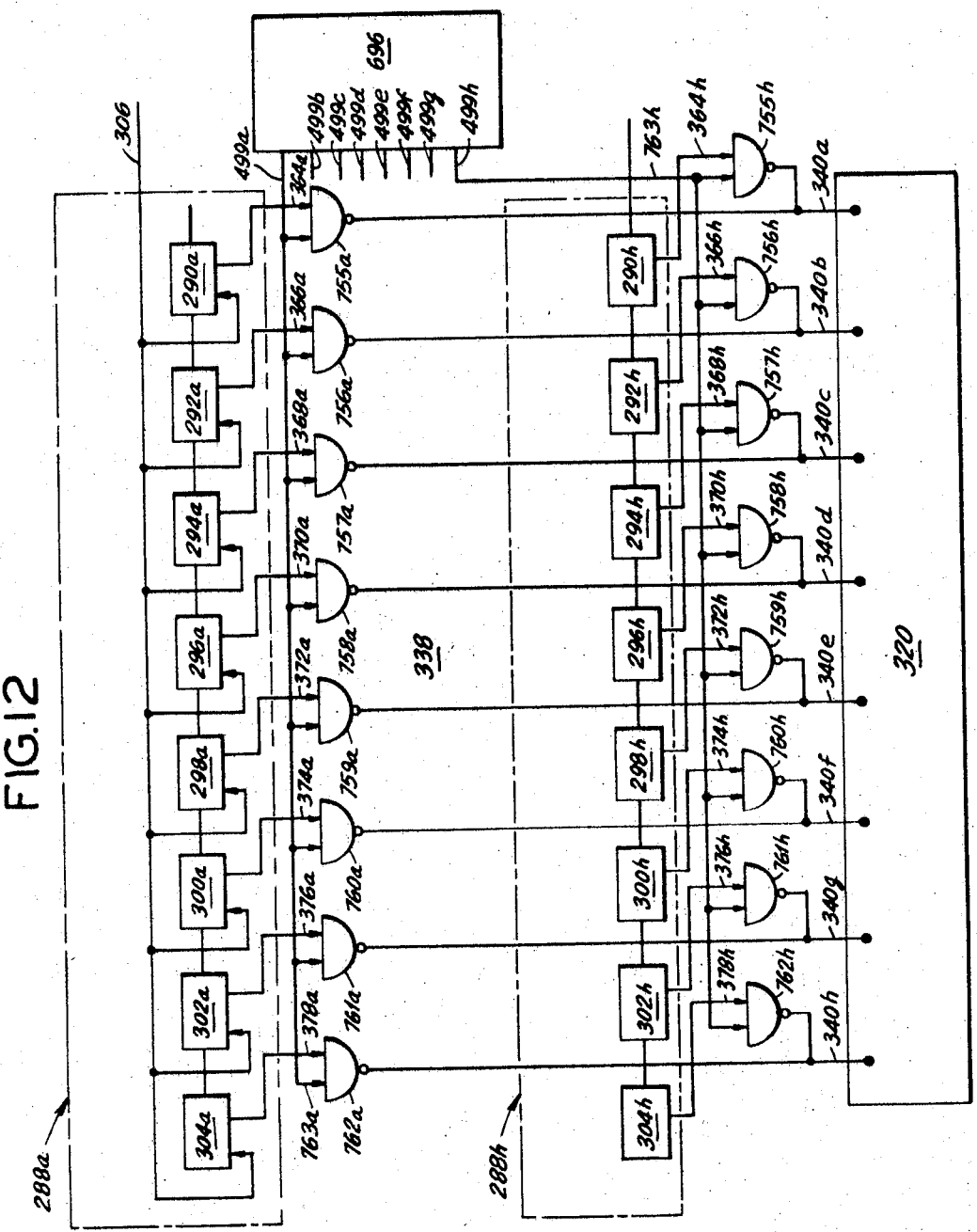

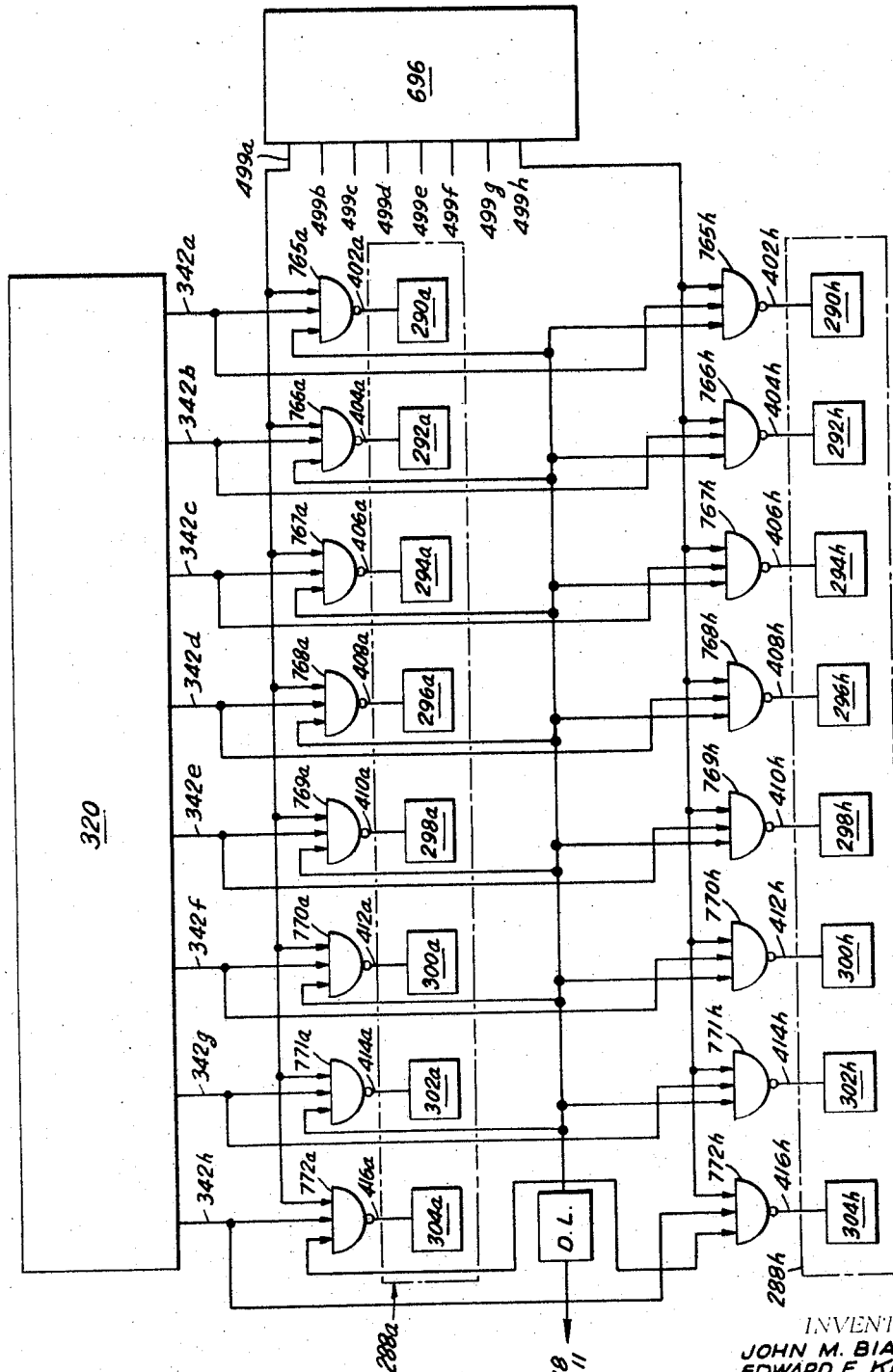

3,424,859
AUTOMATIC DISTRIBUTION CENTRAL
John M. Bialo, Jamaica, Edward F. Keiser, Syosset, and Joseph H. Vogelman, Roslyn, N.Y., assignors to Clavier Corporation, Richmond, N.Y., a corporation of New York
Filed Aug. 23, 1965, Ser. No. 496,734
U.S. Cl. 178—3         46 Claims
Int. Cl. H04l 11/20

ABSTRACT OF THE DISCLOSURE

A multichannel distribution central station for teletypewriter type signals which automatically switches messages from a plurality of incoming lines to desired outgoing lines and translates the speed of all incoming messages into one or more desired standard outgoing message speeds.

---

This invention relates to communication systems and particularly to a multichannel distribution central station for teletypewriter signal systems.

Teletypewriters transmitting at conventional speeds of 75 to 150 words per minute are still in use but are becoming obsolete and are being supplanted by faster teletypewriters capable of handling speeds up to 1200 words per minute and data transmitters capable of handling up to 1200 bits per second. As these improved equipments are developed and introduced into tactical field communication networks, there is a simultaneous need for high speed switching and speed translation equipment which can make the newer equipments compatible with existing communication devices.

While speed translation of Teletype Baudot code or Fieldata bits can be readily accomplished by using large data handling equipments and computers, these complex and giant fixed station computers obviously become impractical for tactical field communications.

It is an object of the invention to provide an improved distribution central station for a communication system which receives messages at various speeds on a plurality of incoming lines and switches them to desired outgoing lines with a "carbon copy" of selected incoming messages to a selected outgoing line.

It is also an object of the invention to provide an improved distribution central station which receives messages at various speeds on a plurality of incoming lines and automatically translates them to one or more standard speeds for transmission on outgoing lines.

It is further an object of the invention to provide an improved distribution central station which is small in size, light in weight and portable for field application such as military duty.

In accordance with this invention there is provided an automatic multichannel distribution central station which comprises a plurality of incoming message lines adapted to receive a message having informational bit pulses and address bit pulses, a plurality of outgoing message lines and channel equipment associated with each of the incoming message lines; the channel equipment comprising a master clock oscillator; a first means coupled to its associated incoming line and the master clock oscillator for detecting the bit pulse rate of a message appearing on its associated incoming message line; a second means coupled to the first means for generating a signal corresponding to the bit pulse rate of the message detected by the first means; a shift register; a third means coupling its associated incoming line and the second means to the shift register for selectively transferring the informational bit pulses from its associated incoming message line into the shift register; a message storage means; a fourth means coupling the shift register to the message storage means for selectively transferring a group of the informational bit pulses from the shift register into and to fill the message storage means; a fifth means for determining when the message storage means is filled with the groups of the informational bit pulses; a sixth means coupled to the shift register for storing the address bit pulses containing intelligence as to which outgoing line is to receive the informational bit pulses appearing on its associated incoming line; a seventh means coupled to the sixth means for determining whether the outgoing line corresponding to the address bit pulses is available; an eighth means controlled by the fifth and seventh means and coupling the message storage means to the shift register for dumping the groups of informational bit pulses from the message storage means back into the shift register when the outgoing line corresponding to the address bit pulses is available; and a ninth means coupling the shift register to the outgoing message line corresponding to the address bit pulses.

Overall circuit simplification is achieved and equipment bulk is reduced by:

(A) Switching (rather than duplicating) components within each channel equipment where there is need for the same circuits to transfer (dump) the stored message bits out of the memory system as was needed to transfer (fill) the incoming message bits into the memory system. Examples of such component circuits are: counter chain frequency dividers, clock reset generator, bit counter, character counter, early and late gate generators and shift register;

(B) Utilizing components in common (rather than duplicating) among all channels. Examples of such components are: master clock oscillator, channel access encoder, carbon copy line selector and outgoing line availability/unavailability detectors; and (C) Time Sharing (rather than duplicating) components among all channels. Examples of such components are: input circuitry (data input funnel) to memory or message storage system, word location funnel for memory system, load/unload funnel for memory system, output circuitry (data output funnel) from memory system and addressed output line selector.

In one embodiment of the invention, Fieldata and Baudot coded messages at various input speeds are temporarily stored in a magnetic core memory and are then retransmitted at standardized output speeds to accommodate available receivers. Accordingly, transmitters and receivers which operate at different speeds become compatible. A particular advantageous embodiment of the invention handles eight input lines and eight output lines and automatically identifies and adapts itself to 75, 100, 150, 600 or 1200 words per minute Baudot code, or to 75, 150, 300, 600 or 1200 bits per second Fieldata. For simplification and standardization purposes, previously developed NAND logic modules will be used throughout the system. A single central clock provides a common time base for all channels of the system. The complete system can advantageously be encased in four cabinets of identical shape and size for providing portability in the field.

As contemplated, upon accepting incoming messages, the transmission speed is detected so that sensing intervals may be established during which the subsequent bits making up the characters can be read and identified. This detection is accomplished by measurement of the time interval between the first and second transitions of the first prefatory character of the message.

The message input signal, reconstituted by a Schmitt trigger, is applied to a signal gate which passes it, unless blocked, by an inhibit voltage (present only when the previous message has not yet been cleared). The first two transitions, whether positive- or negative-going, generate a pair of pulses, the spacing between which is used by the speed-recognition logic to ascertain the message speed.

The first transition of the first pulse starts a counter chain network which establishes a series of gates, each occurring at specific intervals and for specific periods after the starting pulse. Occurrence of the second transition of the first pulse during one of these gate periods provides an indication of message transmission speed and a corresponding identifying signal is generated. If the second transition of the first pulse does not occur during one of these gate periods (due to either its occurrence between periods or non-occurrence during the full counting interval) a "Non-member" signal is generated instead.

The counter chain is made to serve a dual function, being employed not only for the initial interval measurement but also for the establishment of synchronized gates at which the signal is subsequently sensed to determine presence or absence of pulses. Since a separate counter chain is needed for each of the eight input signal channels, it therefore becomes important that the number of components, and hence the number of clock counts, be minimized. Selection of as slow a clock frequency as possible, while still providing the required resolution, is important in reducing the size and complexity of the computer. It has been found that a rate of 171.84 kilopulses per second is particularly advantageous from considerations of the nominal bit-intervals of the various transmission speeds of input signals, the tolerances thereon, the guard band requirements and the necessary integral relationships inherent in the counting network output. The numbers of clock counts corresponding to the various transmission speeds are indicated at the flip-flops following the counter chain networks. In association with these gates there is provided "lock-forward" circuitry to prevent subsequent recurrence of a gate while permitting relatively simple gate generators. For example, the 8-to-10 count gate for 1200 bits per second Fieldata would also occur at 24-to-26 counts, 264-to-266 counts, etc. without such feature.

Occurrence of the second transition of the first pulse within one of the gate periods thus established causes the flip-flop associated with the particular kind and speed of transmission represented by that gate to enter the "set" condition. This permits processing of the remainder of the message, the detection function ceasing to be operative. Should the second transition occur during a period when no gate is open, a "non-member" condition is invoked; should no second transition occur at all before a selected long count, of say 424, the leading edge of a 424-to-432-count generator is employed to create the "non-member" condition.

Once a specific type and speed of transmission has been detected as indicated by the associated flip-flop entering the "set" condition, synchronization, i.e., the establishment of a series of properly timed gates during which each subsequent bit is looked at, takes place. The manner in which synchronization is accomplished for Baudot and for Fieldata transmission differs somewhat because of certain inherent differences in these codes. Baudot transmission which is used mostly for teleprinter communications, is fundamentally "non-return-to-zero" between bits and the message may furthermore pause at the end of any character, resuming again only after an indeterminate period. Fieldata transmission, on the other hand, proceeds without interruption once started, and is not only inherently return-to-zero between bits but may have a duty cycle as small as 20%. Basically, for both Fieldata and Baudot codes, synchronizing intervals are employed each separated in time by the nominal interval between bits in the message. Also, for Baudot transmission the count is restarted from the first bit of each character while for Fieldata the count is restarted by the nominal bit period if the signal is a ZERO (0) or after each ONE (1) as it occurs in the message.

For Fieldata, the leading edge of the ONE (1) pulse resets a counter to zero and a counter, which is similar to the detection counter then generates an interval N which is substantially 10% of a nominal period between bits, at the end of which a shift register is pulsed.

In the event that one of the ZERO's in a Fieldata message is replaced by a synchronizing pulse the counter is resynchronized by its leading edge, the same as was done in the case of a ONE in the Fieldata message. Subsequent readings will then be correspondingly closer to mid-pulse position, permitting even greater variation in speed. Greater positive variations in speed are also permitted for duty cycles greater than 20%.

In addition, an "early zone" gate, of width equal to that of gate N, preceding the expected time of arrival of the first transition is provided. Noise pulses arriving outside of the "looking" period are gated out.

For Baudot signals, the initial synchronization is effected by the leading edge of the initial character pulse, with which each Baudot character always starts, and the bits subsequently are read into a shift register, in the same manner as used for Fieldata. Reading takes place near the mid-pulse position, the gating being quite analogous to that occurring in an ordinary mechanical teleprinter. Since the spacing between Baudot characters is variable, synchronization also starts anew with each character. Because of the shorter character bit-length and the virtually 100% duty cycle of Baudot transmission, it is possible to use much wider gates than for Fieldata, and hence accommodate manifold greater transmission speed variations than can be tolerated for Fieldata transmissions.

To minimize the number of components, the same register is used for both Baudot and Fieldata messages and for the same message going into and out of the memory system. Advantageously, the register has a capacity of 8-bits, all of which are transferred in parallel to specific addresses in the core memory, at 8-bit intervals.

The filling of the memory proceeds until all the cores allocated to the channel in question have been placed in the required states, then the cycle is repeated. The input message has two prefatory characters (one for speed and type of transmission detection and one for address information) which are to be stripped from the outgoing message. Since the system is designed for fixed length messages, this is readily accomplished by making the input message two characters longer than the capacity of the memory. The first two characters are thus destroyed when "printed over" by the last two.

Auxiliary counters are provided which automatically transfer the memory from its "fill" to its "dump" mode when the fixed length message has been completed. Switching to the appropriate output line or lines is automatically accomplished by gates which are triggered by the content of the second prefatory character of the message. This character contains the routing information, which may be to any one of the eight output lines, either with or without a "carbon copy" to a predetermined one of them, as designated by the setting of a manual selector switch. For Baudot input messages, the output message can advantageously be 100 words per minute, 7.5-unit Baudot and for all Fieldata input messages the output message can be 600 b.p.s. Fieldata, 50% duty cycle.

A busy condition of the output line designated (or of the line for which a "carbon copy" is designated) or other condition preventing acceptance of input messages is indicated by a change in input line impedance.

Other objects and features of the present invention will be set forth or apparent in the following description and claims and illustrated in the accompanying drawings, which disclose by way of example and not by way of limitation, in a limited number of embodiments, the principle of the invention and circuit implementations of the inventive concept.

In the drawings, in which like reference numbers designate like components in the several views:

FIGS. 1a and 1b illustrate a portion of a single channel of the multichannel automatic distribution central station according to the invention and in particular circuitry for identifying the transmission speed of a message received by such single channel;

FIG. 7 illustrates the generation of a gating interval in FIG. 1a to identify a single transmission message speed arriving on an incoming line of FIG. 1a;

FIG. 12 represents a data input funnel for the memory system illustrated in FIG. 8 according to the invention;

FIG. 13 represents a data output funnel according to the invention for the memory system illustrated in FIG. 8;

Figure 1B:
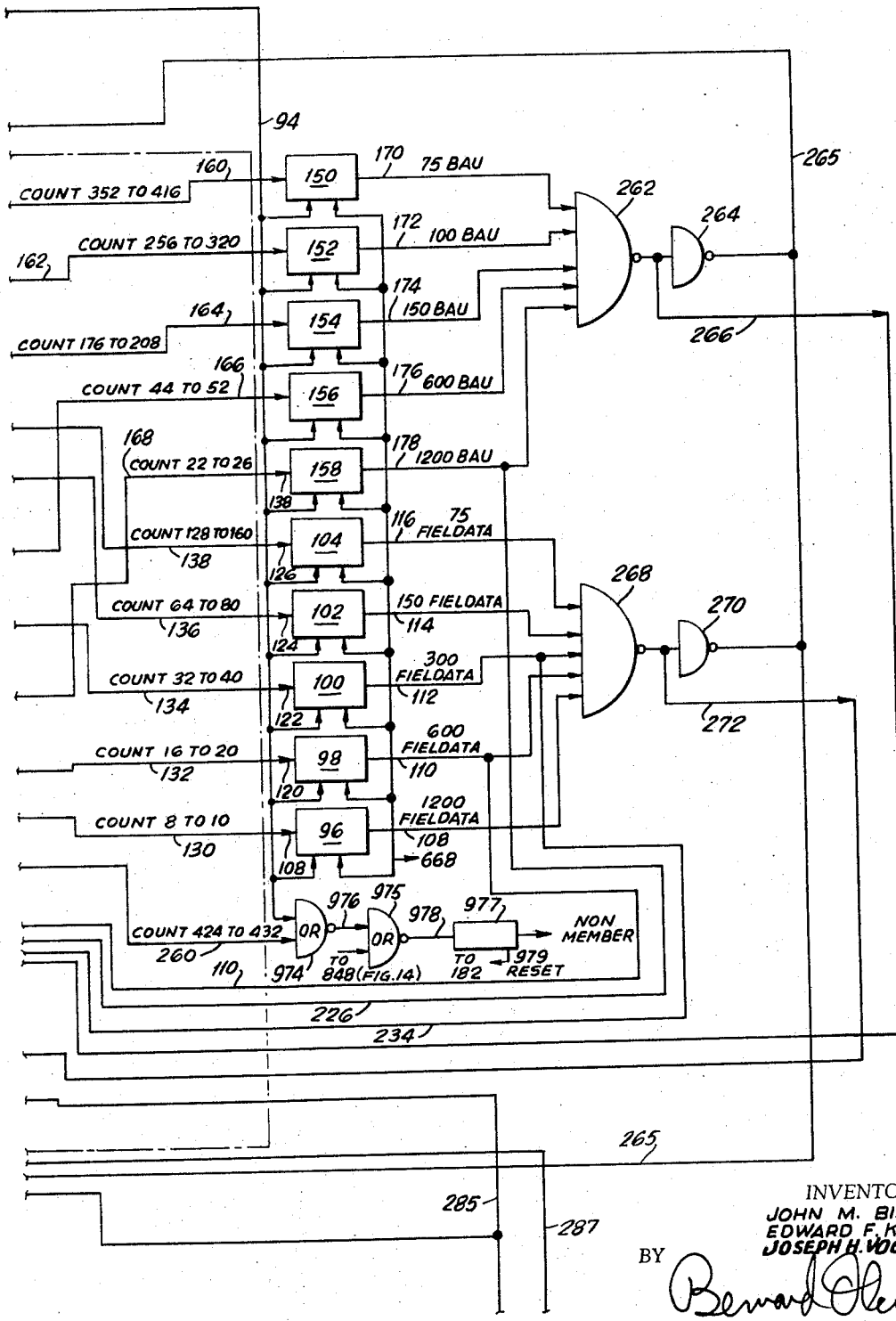
Figure 8:
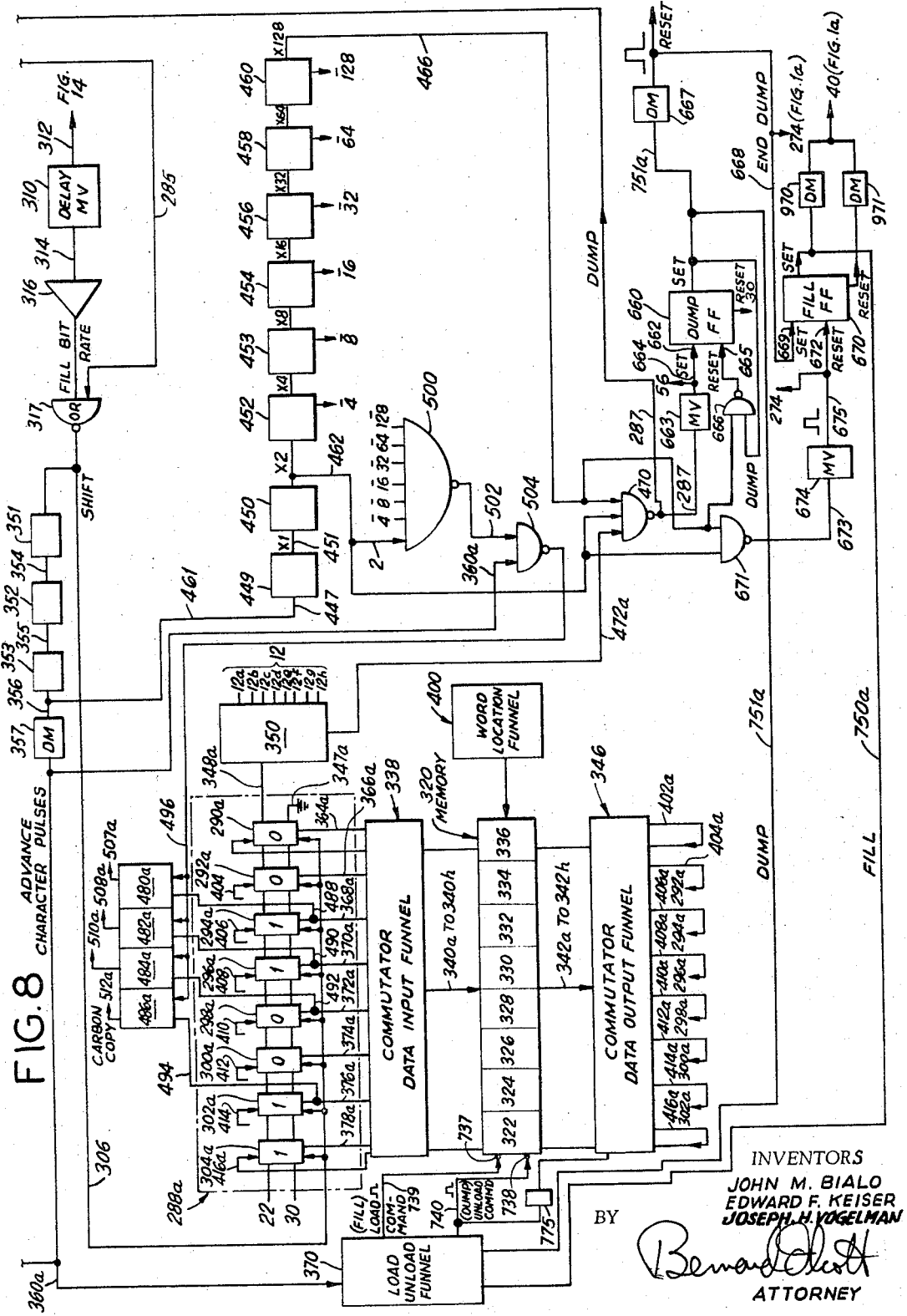
FIG. 8 represents another portion of the automatic distribution central station system which is to be considered with FIGS. 1a and 1b, FIG. 8 particularly illustrating, according to the invention, the routing of incoming messages into a memory system, out of the memory system and onto a desired outgoing message line, with a "carbon copy" to another desired outgoing line.

FIGS. 1a, 1b and 8 represent one channel of a multichannel automatic distribution central station which is connected at its input side to a plurality of incoming message lines 10 (FIG. 1a) and at its output side to a plurality of outgoing message lines 12 (FIG. 8). For illustration only, eight incoming lines 10a to 10h and eight outgoing lines 12a to 12h will be assumed. The messages on lines 10a to 10h can either appear in Baudot code or Fieldata code, either code occurring at any one of a number of message speeds. For instance, the Baudot code could be at either 75, 100, 150, 600 or 1200 words per minute and the Fieldata message speed could be either 75, 150, 300, 600 or 1200 bits per second. The automatic distribution central station channel of FIGS. 1a, 1b and 8 switches the message on any incoming line 10, such as 10a, to a selected one, such as 12b, of a plurality of output message lines 12 with a "carbon copy," if desired, of such outgoing message on another preselected output message line, such as 12a. Furthermore, the automatic distribution central station translates the message speed on incoming lines 10 so that the message speed on the outgoing message lines 12 are all at a selected standard message speed. For instance, regardless of the message's speed of the Baudot code on line 10a, a single standard Baudot code would appear on one of the output lines 12a to 12h at 100 words per minute and any Fieldata code appearing on line 10a will be translated to 600 bits per second on the selected one of the output message lines 12a to 12h.

In FIG. 1a, incoming message line 10a is connected to a Schmitt trigger 14 which regenerates the coded signal on line 10a so as to eliminate noise and reshape the incoming signal. A NAND gate 16 has one input connected by a lead 18 to the output side of Schmitt trigger 14. The other input to NAND gate 16 on line 20 "opens" the gate 16 when the channel is not in a "dump mode" and the control of the signal on line 20 will be explained later. At this time, it will be assumed that gate 16 is "open" and the message signal on the output lead 22 of gate 16 is conducted to the input sides of a delay multivibrator 24 and an inverter 26. The output of inverter 26 is connected to the input side of another delay multivibrator 28 by a lead 30.

Figure 2:
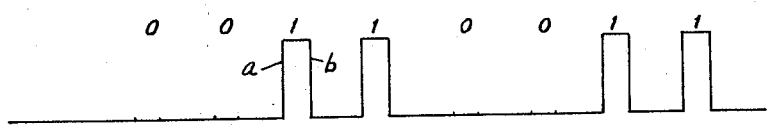
FIG. 2 illustrates a typical eight bit character of a message in Fieldata code.
Figure 3:
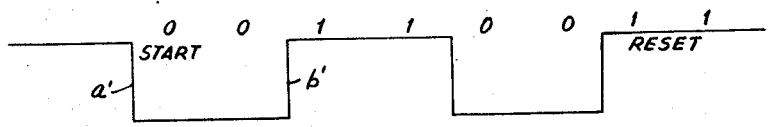
FIG. 3 illustrates a typical eight bit character of a message in Baudot code.

FIG. 2 represents an incoming message 0,0,1,1,0,0,1,1 in Fieldata code. FIG. 3 represents the same message in Baudot code. It will be assumed that each input message has two prefactory characters (one to be used for detection of message speed along with type of transmission and one containing outgoing line address information) which are later stripped from the output message. From FIGS. 2 and 3, it will be clear that the incoming message speed can be identified by the time interval between $a$ to $b$ of FIG. 2 (Fieldata code) or $a'$ to $b'$ of FIG. 3 (Baudot code).

Figure 4:
FIG. 4 represents pulses generated in the system of FIG. 1a which identify the speed of the Fieldata message illustrated in FIG. 2.
Figure 5:
FIG. 5 represents pulses generated in the system of FIG. 1a which identify the speed of the Baudot message illustrated in FIG. 3.

Multivibrators 24 and 28 are "single-shot" multivibrators which produce a single pulse of a preselected pulse width when energized at their input sides with a positive going transition. Accordingly, the signals at the output sides of multivibrators 24 and 28 on lines 32 and 34 are shown in FIGS. 4 and 5 as $c$ and $d$ (Fieldata code) or $c'$ and $d'$ (Baudot code). The time interval between pulses $c$ and $d$ or $c'$ and $d'$ establishes the message speed. The inverter 26 is necessary since we are interested in both the first positive and the first negative transition of the first pulse of FIG. 2 or FIG. 3 and multivibrators 24 and 28 respond to transitions in the same direction.

A pair of NAND gates 36, 38 each has one input connected to lines 32 and 34, respectively. The other inputs to gates 36 and 38 are inhibiting inputs connected to a lead 40 to prevent message transmission through the automatic distribution station for a short period, say 200 microseconds, at the beginning of the message storage or "fill mode" (to be explained later). The output of gates 36 and 38 on separate leads 42 and 44 are connected to an OR gate 46 which places the signals onto lines 42 and 44 to a single output lead 48 in an inverted relationship. Lead 48 is connected to one input of a NAND gate 50. At the time when the first pulse appears on lead 48, the other two inputs on leads 52 and 54 respectively have signals thereon (as explained later) to "open" gate 50 so that the first pulse corresponding to $c$ or $c'$ of FIGS. 4 or 5 on lead 48 is conducted to one input of OR gate 56 by a lead 58. The signal on lead 58 is the "start of sequence" signal to "open" NAND gate 60 for allowing the output of master clock oscillator 62 (which is constantly running and common to all channels) on lead 64 to enter counter chain network 66 on lead 68 connected to the output side of gate 60. The frequency of clock oscillator 62 is substantially greater than the highest bit rate interval of the Fieldata message code and we will assume that the frequency of oscillator 62 is 171.85 kps.

The start of sequence pulse on lead 58 (corresponding to c or c' of FIG. 4 or FIG. 5) is conducted through gate 56 to a lead 57 which is connected to the "set" terminal 59 of a flip-flop 61 to provide an enabling signal on its output lead 63 to gate 60 for "opening" the latter.

Counter chain network 66 comprises a plurality of serially connected dividers, each dividing the frequency at its input side by two. In the embodiment shown in FIG. 1a, twelve dividers 72a, 72b, to 72m are connected in series to lead 68. The signal on output lead 74 of frequency divider 72d has divided the frequency of oscillator 62 by a factor of 16 and, for the embodiment illustrated, the period of the signal on line 74 is chosen to be 93 microseconds. Such frequency (10.74 kps.) will hence forth be designated as count 1. Accordingly, the output frequency of dividers 72e, 72f, 72g, to 72m will be count 2, count 4, count 8 to count 256, respectively.

Each of the dividers 72a to 72m have a second output terminal (illustrated at the right hand sides thereof in FIG. 1a) for providing an inverted polarity signal which is 180° out of phase with the signal on the serial signal path between the frequency dividers. As shown, frequency dividers 72f and 72g have such inverted outputs on terminals 76 and 78 respectively, the signal on such terminals being designated $\bar{4}$ and $\bar{8}$ as meaning "inverted 4" and "inverted 8," respectively. Henceforth, corresponding symbolism will have corresponding meaning in this disclosure.

Figure 6:
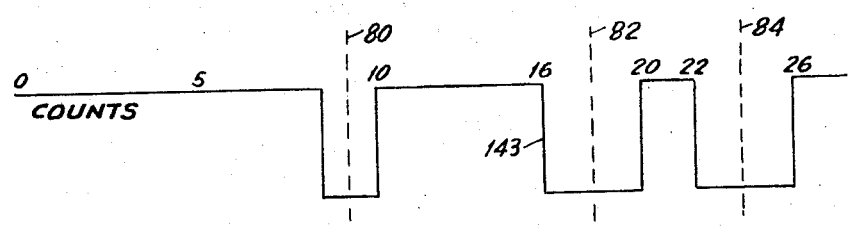
FIG. 6 illustrates the gate intervals generated in the selective portion of FIG. 1a which identify three different incoming message speeds.

FIG. 6 illustrates the occurrence in point of time of pulses d or d' (FIGS. 4 or 5) for 1200 Fieldata, 600 Fieldata and 1200 Baudot code as dashed lines 80, 82 and 84, respectively, with reference to time equal zero when the first pulse c or c' (FIG. 4 or FIG. 5) appears on lines 48, 58 and 68. An assumption will now be made that a message appears on the incoming line 10a in 600 Fieldata code and the circuitry for identifying such code will now be described. As previously stated, pulse d (second transition of first prefactory character) appears on lead 42 and a 600 Fieldata code would space pulse d from pulse c (first transition of first prefactory character) by an interval of 18 time counts. Lead 42 is connected to the input side of an inverter 86 and a lead 88 is connected on the output side of inverter 86 and one input side of a NAND gate 90. Assuming an enabling signal on the other input lead 92 (to be explained later) to gate 90, the signal on the output lead 94 of gate 90 will have impressed thereon pulse d of FIG. 4. Lead 94 is connected to the "set" input terminal of each flip-flops 96, 98, 100, 102 and 104 (see FIG. 1b), the resulting output of such flip-flops representing 1200, 600, 300, 150 and 75 Fieldata codes on output leads 108, 110, 112, 113 and 116, respectively. The enabling input terminals 118, 120, 122, 124 and 126 of flip-flops 96, 98, 100, 102 and 104 are connected to leads 130, 132, 134, 136 and 138 respectively.

Counter chain network 66 also comprises a plurality of NAND gates shown in FIG. 1a as 142a to 142p (fifteen in number in accordance with the assumptions made for illustrative purposes only). Inputs to such NAND gates have symbolism to denote connections to the frequency dividers 72a to 72m as explained above. For instance, NAND gate 142n has 3 signal inputs 16, $\bar{8}$ and $\bar{4}$ from frequency dividers 72h, 72g and 72f by lead connections 144, 146 and 148 to the serial output of divider 72h, inverted terminal 78 and inverted terminal 76, respectively.

Figure 7:
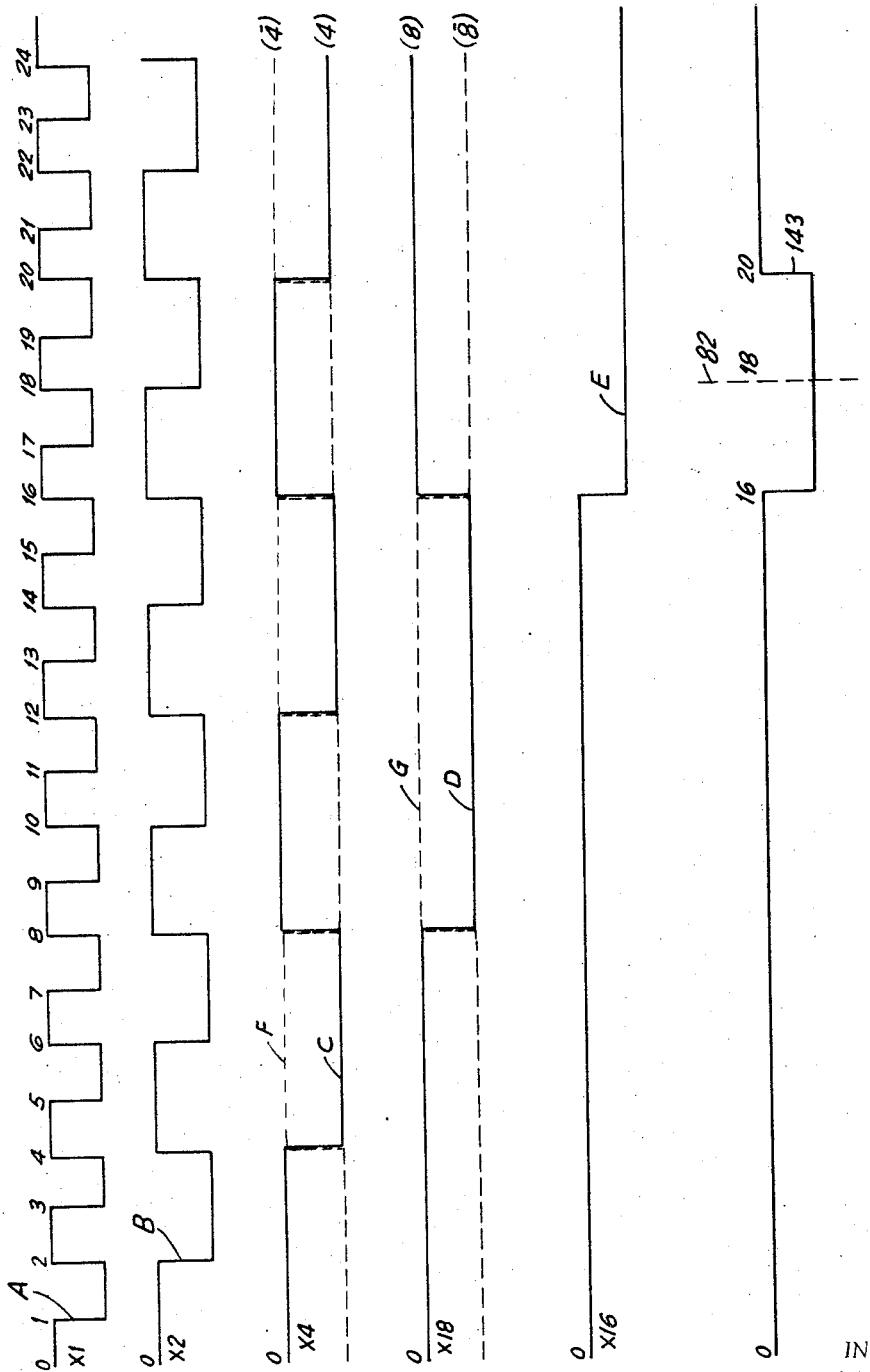

Referring to FIG. 7, wave form A represents the serial output of frequency divider 72d on lead 74 as a "count 1" frequency. Wave forms B, C, D and E represents the outputs of 72e (count 2), 72f (count 4), 72g (count 8) and 72h (count 16), respectively. Since gate 142n is a NAND gate, each of the three frequency divider signal inputs and also the signal on lead 131 must be a 1 for impressing a signal on output lead 132 from 142n. FIG. 7 shows the inverted wave $\bar{4}$ and $\bar{8}$ of C and D as dashed lines F and G. Inspecting FIG. 7, it is found that the conditions for "opening" gate 142n appear only during the count interval 16 to 20 in respect of wave forms $\bar{4}$, $\bar{8}$ and 16, and when the signal on lead 131 is a 1 (to be explained later). The bottom wave form on FIG. 7 duplicates the gate diagram of FIG. 6 with respect to 600 Fieldata code which has a bit frequency rate represented by the dashed line 82. Accordingly, the signal on lead 132 enables flip-flop 98 for the interval count 16 to count 20 to permit the d signal (FIG. 4) on lead 94 to provide a distinctive signal on lead 110 to announce that the message code on incoming line 10a is in 600 Fieldata code. It is to be understood that all of the signal input connections between NAND gates 142a to 142p and frequency dividers 72a to 72m will be made according to the symbolism shown in the example given. Therefore, distinctive signals on leads 116, 114, 112, 110 and 108 (FIG. 1b) represent the identification of the incoming message on line 10a as 75 Fieldata, 150 Fieldata, 300 Fieldata, 600 Fieldata and 1200 Fieldata codes, respectively.

Similarly, a plurality of flip-flops, shown in FIG. 1b as five flip-flops 150, 152, 154, 156 and 158, each have their enabling inputs connected to leads 160, 162, 164, 166 and 168, respectively. Further, each of such flip-flops have their "set" input terminals connected to lead 94. Lead 160 is connected to the outputs of gates 142a and 142b and according to the connections shown in FIG. 1a, a gating interval of 352 to 416 counts will appear thereon. Lead 162 is connected to the output of gate 142c and a gating interval of 256 to 320 counts will be impressed thereon. Lead 164 is connected to the outputs of both gates 142d and 142e for generating thereon a gating interval of 176 to 208 counts. Lead 166 is connected to the outputs of gates 142h to 142i which generate gating intervals of 44 to 52 counts. Lead 168 is connected to the outputs of gates 142k and 142m, for generating a gating interval of 22 to 26 counts. In this manner, distinctive signals will be generated in FIG. 1b at the output sides of flip-flops 150, 152, 154, 156 and 158 on leads 170, 172, 174, 176 and 178 to identify a message signal on incoming line 10a as 75 Baudot, 100 Baudot, 150 Baudot, 600 Baudot or 1200 Baudot, respectively.

Unless some "lock out" circuitry is incorporated in the counter chain network 66, the gating interval 143 in FIG. 7 of 16 to 20 will repeat between count intervals 48 to 52 and 80 to 84, etc., each separated by 32 counts. Since it is important to eliminate all but the first gating interval (such as 16 to 20 on line 132), FIG. 1a shows counter chain network 66 as incorporating a plurality of NAND gates 182, 186, 190, 194, 198, 202, 206, 210, and 214 which are each connected at its input side in a feedback loop from the next lower frequency flip-flop of the group 96 to 104 and 150 to 158. For example, lead 110 which identifies 600 Fieldata code is connected to one input of gate 214 which is associated with the gate 142o of the next higher message code frequency. Gate 214 at its output side is connected to the input of a gate 216 by a lead 218 and the output of gate 216 is connected to one input of gate 142o by a lead 220. Another input of gate 214 is connected to the $\overline{16}$ output of flip-flop 72h according to the symbolism explained. Another input of gate 214 is connected to the output of a gate 212 by a lead 222, the latter gate being connected to the output of gate 210 by a lead 224. Also, the output of gate 212 is connected to lead 131 which is connected to one input of gate 142n as previously explained. One of the inputs to gate 210 is connected to lead 178 of flip-flop 158 (which is the next lower message frequency identifier) by a lead 226. Another input of gate 210 is connected to the output of a gate 208 by a lead 228 which is also connected to a lead 230 connected to one input of both gates 142k and 142m. The input of gate 208 is connected to the output of gate 206 by a lead 232 while one of the inputs to gate 206 is connected to the lead 112 (which is connected to flip-flop 100 of the next lower frequency) by a lead 234. In similar fashion, one input of gates 182, 186, 190, 194, 198 and 202 is connected to leads 170, 172, 174, 116, 114, and 176, respectively. Also, the outputs of gates 182, 186, 190, 194, 198 and 202 are connected to the inputs of gates 184, 188, 192, 196, 200 and 204 by leads 236, 238, 240, 242, 244 and 246, respectively. Further, the output of gate 184 is connected to both an input of gate 186 and one input of gate 142c by a lead 248, the output of gate 188 is connected to an input of gate 190, an input of gate 142d and an input of gate 142e by a lead 250, the output of gate 192 is connected to an input of gate 142f and an input of gate 194 by a lead 252, the output of gate 196 is connected to an input of gate 142g and an input of gate 198 by a lead 254, the output of gate 200 is connected to an input of gate 202, an input of gate 142h and an input of gate 142i is connected by a lead 256, and the output of gate 204 is connected to an input of gate 142j and an input of gate 202 by a lead 258.

The lock-out circuit functions as follows. The first gating pulse between the intervals 16 and 20 appearing on line 110 causes a distinctive signal 0 to appear on lead 110 and since the signal on the other inputs to gate 214 on leads 222 and $\overline{16}$ are also the same distinctive signal 0, the signal on the output 218 of NAND gate 214 is a 1. Accordingly, the signal on the output lead 220 of inverter 216 is a 0 and gate 142o together with its flip-flop 96 is "locked out." All the other message codes which have a slower frequency than the 600 Fieldata code are automatically "locked out" because their bit pulses occur later in time than the bit pulse frequency rate of the 600 Fieldata code.

Since spurious responses can normally be expected on lead 132 at counts 48 to 52, 80 to 84, 112 to 126, 144 to 148, 176 to 180, 208 to 212, etc., all occurring 32 counts later, 64 counts later, 128 counts later and 256 counts later, each of such spurious responses, in order, are locked out by gate 198 (and inverter 200), gate 194 (and inverter 196), gate 190 (and inverter 192) and gate 186 (and inverter 188). When any of the spurious responses tend to occur at 32 counts, 64 counts, 128 counts and 256 counts, the potential on lead 228 becomes 0 to close NAND gate 210. Thereby a 1 signal is impressed on lead 244 which because of inverter 212 impresses a 0 signal on lead 131 to close NAND gate 142n for preventing such spurious responses on lead 132.

By the arrangement just described, lock-out circuits including gates 182 to 216 assure that each of the leads 130 to 138 and 160 to 168 and 260 have but a single detection gating interval without other spurious responses.

Leads 170, 172, 174, 176, 178 (FIG. 1b) are connected to respective inputs of a NAND gate 262, the latter being connected to leads 92 and 54 through an inverter 264 and a lead 265. A lead 266 connected to the intrconnection between gates 262 and 264 has a distinctive signal impressed thereon only when the incoming message on line 10 is in Baudot code.

Leads 108, 110, 112, 114 and 116 are connected to respective inputs of a NAND gate 268. The output of gate 268 is connected to leads 92 and 54 through an inverter 270 and lead 265. A lead 272 connected to the interconnection between gates 268 and 270 will have a distinctive signal impressed thereon when incoming line 10 detects a message in any Fieldata code.

Accordingly, whenever any "member" code (75 Baudot, 100 Baudot, 150 Baudot, 600 Baudot, 1200 Baudot, 75 Fieldata, 150 Fieldata, 300 Fieldata, 600 Fieldata, or 1200 Fieldata) appears on incoming line 10a, the signal generated on leads 265, 92 and 54 closes gates 90 and 56 to signify that the initial detection was accomplished for the purpose to be explained hereinafter.

As shown in the circuits in FIG. 1a, it is preferable to start and stop the master oscillator signals on lead 68 at the beginning and end of each character of a Baudot code. That is to say, referring to FIG. 3, the timing signals on lead 68 are to start when the transition a' occurs and such signals are to stop after 7.42 bits (of after the eighth bit). Accordingly, an OR gate 274 has one input connected to a lead 276 which is connected to a circuit (to be explained later) which yields a 1 signal whenever eight bits of Baudot code are counted. The output of gate 274 is connected to the reset terminal of flip-flop 61 by a lead 278 so that a signal appearing on lead 276 at the end of each Baudot character will "reset" flip-flop 61 to "close" gate 60 and thereby prevent the output of master clock oscillator 62 from reaching lead 68.

On the other hand, the master clock oscillator signals are maintained uninterrupted on lead 68 throughout a Fieldata message transmission or during an eight bit character in Baudot code but flip-flops 72a to 72m are "reset" at a time interval of one bit rate for both codes. The reset signal is conducted by a lead 277 connected to all the "reset" terminals of flip-flops 72a to 72m, lead 277 being connected to the output side of a delay multivibrator 278 which forms a required "reset" pulse whenever any one of its six inputs are properly energized. One of the inputs to 278 is connected to lead 63 which has a reset positive transition generated thereon whenever flip-flop 61 turns off clock gate 61, as for instance at the end of each Baudot character. Another input to 278 is connected to the output side of a delay multivibrator 280 by a lead 282. The input side of 280 is connected to lead 265 which has a distinctive signal impressed thereon whenever a message appears in either Fieldata or Baudot code as determined by flip-flop 150 to 158 and 96 to 104. Accordingly, a "reset signal" appears on lead 277 whenever an initial detection is accomplished.

Preferably, according to the invention, the outgoing messages on lines 12a to 12h are either 600 Fieldata code or 100 words per minute Baudot code. That is to say, a message on incoming line 10a in either 75 Fieldata, 150 Fieldata, 300 Fieldata, 600 Fieldata, or 1200 Fieldata code will be translated upon one of the output lines 12a to 12h according to the coding in the second prefatory character but always at an outgoing 600 Fieldata code. Also, any message upon incoming line 10a in 75 Baudot, 100 Baudot, 150 Baudot, 600 Baudot, 1200 Baudot, will be translated and appear on one of the output lines 12a to 12h according to the coding in the second prefatory character but at a speed of 100 words per minute. Accordingly, in order to set the selected standard Baudot and Fieldata outgoing message speeds, counter chain network 66 incorporates NAND gates 284 and 286, one input of gate 284 being connected to lead 266 (the Baudot code identifying output) and one input of gate 286 being connected to lead 272 (the Fieldata identifying output). Another input of both gates 284 and 286 is connected to a lead 287 upon which is impressed a signal to signify the beginning of the "dump" mode which will be explained later. The other five inputs to gate 284 are connected to the 128, $\overline{64}$, $\overline{32}$ and 16 terminal outputs of flip-flops 72k, 72j, 72i and 72h, respectively. The other four input terminals of gate 286 are connected to the 8, $\overline{4}$, $\overline{2}$ and 1 output terminals of flip-flops 72g, 72f, 72e and 72d, respectively. A common lead 285 is connected to the output sides of both gates 284 and 286. With such circuit connections, standard pulse signals synchronized to 600 Fieldata and 100 Baudot bit rates (only) will be generated on lead 285.

The circuitry described hereinbefore automatically identifies the type of code and speed of the incoming message on line 10a. The routing of the message as well as the translation of the message speed to a standard output message speed will now be described.

The incoming message signals on line 10a appear on lines 22 and 30 of FIG. 1a and such leads are connected to the input side of a shift register 288a such as Model No. SR-30 as manufactured by Computer Control Co., Inc., Framingham, Massachusetts. As shown in FIG. 8, shift register 288a has flip-flops 290a, 292a, 294a, 296a, 298a, 300a, 302a and 304a, one for each of the eight bits making up a single character. When a lead 306 connected to all the "shift pulse" input terminals of flip-flops 290a to 304a has impressed thereon the shift signals corresponding to the incoming bit rate, each message character appearing on incoming line 10a will be shifted into the register 288a. That is to say, if the incoming signal is coded as that shown in FIGS. 2 or 3, the first bit signal 0 appearing on lines 22 and 30 is shifted into flip-flop 304a upon the occurrence of the first shift pulse. When the second bit pulse of 0 appears on lines 22 and 30, the first 0 in flip-flop 304a is shifted to 302 while the second 0 signal is shifted into flip-flop 302a. Upon the occurrence of the third bit signal of 1, it is shifted into flip-flop 304a while the 0 signal in flip-flop 304a is shifted to flip-flop 302a and the 0 signal in 322a is shifted into flip-flop 300a. Accordingly, with the incoming signal on line 10a shown in FIG. 2 or 3, the bit signals will appear in register 288a after eight shift pulses as 0, 0, 1, 1, 0, 0, 1, 1 in flip-flops 290a, 292a, 294a 296a, 298a, 300a, 302a and 304a as shown in FIG. 8. For generating the shift pulses on lead 306, a delay multivibrator 310 is connected at its input side to a lead 312 on which is generated signals a predetermined time interval after the nominal or expected time when a message bit arrives or is expected (to be explained later in reference to FIG. 14), delay multivibrator 310 responding only to positive going transitions and providing pulses of a preselected width. Accordingly, if the incoming message on line 10a is in 600 Fieldata having a nominal bit rate of 18 counts, a negative transition occurs on lead 312 at count 16 while a positive transition occurs at count 20. Therefore, delay multivibrator 310 will produce a shift pulse at count 20 on its output lead 314, such pulse occurring at count 20 to avoid the transition at count 18 and also so that the nominal 600 Fieldata pulse occurring at count 18 even if slightly delayed (by two counts) will still be shifted into register 288a. If the incoming message on line 10a is 150 Baudot, a shift pulse is delayed by 64 counts after the nominal bit rate of 96 counts to avoid the transitions at 0 and 96 counts. A power amplifier 316 and an OR gate 317 are connected between the output of delay multivibrator 310 and lead 306.

After one character or eight bits of the incoming message on line 10a is shifted into register 288a, it is stored in a memory system 320 such as Model No. 1024 M8RS of the "random access" type as manufactured and supplied by Indiana General Corp., Keasbey, N.J. For the embodiment illustrated, memory system 320 has 1024 memory cores divided into eight sections or channels 322, 324, 326, 328, 330, 332, 334 and 336. As shown in FIG. 8, a data electronic commutator 338 (to be described later) is connected at its input side to the eight shift registers (similar to 288a) associated with the eight incoming lines (10a to 10h), FIG. 8 merely showing the connections to one shift register 288a. The signals from all eight shift registers appear on leads 340a to 340h between data electronic commutator 338 and memory system 320 on a time sharing basis, for instance, each shift register is sequentially connected to memory system 320 for ⅛ of a count. The interrupted or commutated bits on lead 340a which correspond to the message on the incoming message line 10a all must be routed to one particular memory section 322 to 336 so that each of such memory sections or channels contains the full message on one of the incoming lines 10a to 10h even though, obviously, the bits of one message do not occur uninterruptedly on line 340a. However, the message bit information which is stored in any one of the sections 322 to 336 is sequentially positioned therein.

After any one of the memory sections 322 to 336 is "filled" (for instance, after 128 informational characters plus two prefatory characters appear on its associated incoming line 10a . . . or 10h), 128 informational characters can be "dumped" on any one of the preselected outgoing lines 12a to 12h with "carbon copy" to another line (if both are available or not used) according to the coding of the second prefatory character in any message. Any one or any number of the memory sections 322 to 336 can be dumping on memory system output leads 342a to 342h at the same time while the other sections can be "filling" on memory system input leads 340a to 340h.

The message (consisting, for instance, of 128 characters) which is dumped on lead 342a is routed to shift register 288a for the second time by an electornic commutator 346 (to be described later), the latter also being connected to the other seven shift registers (not shown) so that the intelligence on leads 342a to 342h can be divided between the eight message channels on a "time sharing" basis. Shift register operations going into and out of the memory system 320 are of the "parallel" type so as to simplify the memory system circuitry. Specifically, intelligence is stored in each memory location by characters (eight bits) and not by individual bits. This requires that eight bits (a full character) are shifted simultaneously in parallel into the memory system 320 on leads 364a, 366a, 368a, 370a, 372a, 374a, 376a and 378a and at a later time to simultaneously remove eight informational bits (one character) from the memory system on leads 402a, 404a, 406a, 408a, 410a, 412a, 414a, and 416a. Accordingly, the eight outputs of commutator 346 (upon which eight bits simultaneously appear from the memory system 320) are connected to flip-flops 290a, 292a, 294a, 296a, 298a, 300a, 302a and 304a by leads 402a, 404a, 406a, 408a, 410a, 412a, 414a and 416a. Shift register 288a is used for the second time to translate eight character bits supplied in "parallel fashion" into "serial" arrangement on output lines 347a, 348a of shift register 288a, lead 347a being grounded.

The dumped message informational bits on lead 348a are conducted to an electronic switch 350 which is controlled by an "address" system (to be described later), the latter being responsive to the information in the second prefatory character of the message on incoming message line 10a. Specifically, electronic switch 350 controls the routing of the message from incoming line 10a to one of the output lines 12a to 12h and optionally with "carbon copy" to another line according to the coding of the second prefatory character, provided that such one or two outgoing message line or lines is/are available and not busy.

For transferring accumulated bits in simultaneous "parallel" fashion into memory system 320 after eight bits (corresponding to one character) are shifted into register 228a, "advance character transitions" are generated every eighth bit by three frequency dividers, 351, 352 and 353 connected in serial relationship, each dividing its input transitions or frequency by one half. The input to the first frequency divider 351 is connected to lead 306 which has impressed thereon the shift pulses corresponding to each message bit. The output of frequency divider 351 is connected to the input of frequency divider 352 by a lead 354 and the output of frequency divider 352 is connected to the input of frequency divider 353 by a lead 355. While the period of signals generated on lead 360a connected to 354 is equal to four bits, its positive going transitions occur at a rate of eight bits or one character. Accordingly, an "advance character" transition every eighth bit is generated on output lead 356. A delay multivibrator 357 which is responsive to positive transitions is connected at its input side to lead 356 for providing "advance character pulses" on lead 360a every eight message bits. Lead 360a is connected to a "load/unload funnel" 370 (to be described later) so that after any one of the eight shift registers, such as 288a (associated with line 10a) is filled, its bit information is simultaneously transferred in a "parallel fashion" to the input of commutator 338 on output leads 364a, 366a, 368a, 370a, 372a, 374a, 376a and 378a of flip-flop 290a to 304a, by the "advance character pulses" appearing every eighth bit on line 360a.

As stated hereinbefore, the message bits on the output lines 340a to 340h of commutator 338 correspond to the message bits on all of the incoming lines 10a to 10h on a "time sharing" basis. Therefore, it is necessary to have a "word locator funnel" 400 to route the message bits on lines 340a to 340h to its proper location in one of the memory sections 322 to 336. Such "word locator funnel" will be described later.

There will now be described a "character counter" which is necessary to determine when any one of the memory system sections 322 to 336 is filled and ready for dumping as well as to isolate the information in the second prefatory character which contains the instruction of which output lines 12a to 12h is to receive incoming message on line 10a and whether another preselected line is to receive a "carbon copy." The character counter comprises frequency dividers 449, 450, 452, 453, 454, 456, 458 and 460 connected in series, each frequency divider reducing the frequency on its input by one-half. The input to the first frequency divider 449 is connected to lead 356 energized by the output of frequency divider 353, the latter providing pulses every fourth bit of the message on the incoming line 10a. Accordingly, the output of frequency divider 449 on lead 451 has generated thereon pulses corresponding to every one character while the signals on output leads 462 and 466 of the second frequency divider 450 and the last frequency divider 460 have pulses corresponding to every 2 and 128 characters, respectively. However, each message (according to the assumption previously made) has 128 message characters preceded by two prefatory characters and hence 130 characters have to be counted before a "dump" signal can be generated. As each of the memory sections 322 to 336 has a capacity for storing 128 characters, the two prefatory characters are erased and replaced by the 127th and 128th character.

Three conditions must be satisfied before a "dump" signal is to be generated: (1) 130 characters must be counted going into one of the memory sections 322 to 336; (2) the selected one of the outgoing lines 12a to 12h must be available (not busy) and (3) if a "carbon copy" of the message is to be simultaneously transmitted on a preselected one of the seven other outgoing lines (according, for instance, to the coding in the seventh bit of the second prefatory character), then such "carbon copy" line must also be available (not busy). An NAND gate 470a is provided to generate a "dump" signal when such conditions are satisfied. The output of frequency divider 460 on lead 466 is connected to one input of NAND gate 470a. Another input to gate 470a is connected to the output of frequency divider 450 by lead 462. Condition (1) will be determined when simultaneous signals appear on leads 466 and 462 to signify a count of 130 characters. The third input to gate 470a on lead 472a will have a signal generated thereon (to be explained later) when conditions (2) and (3) are satisfied for generating a "dump" signal at the output side of NAND gate 470a on lead 287. Since lead 287 is also connected to one input of gates 284 (standard 600 Fieldata output code timing generator) and gate 286 (standard output 100 Baudot code timing generator), such standard pulse generators will be activated by the "dump" signal from gate 470a.

As stated hereinbefore, only the second prefatory character of an entire message has the desired output line address information as well as whether a preselected one of the outgoing lines will also have a "carbon copy." For isolating and storing the second prefatory character information, flip-flops 480a, 482a, 484a, 486a have their inputs connected to outputs of flip-flops 294a, 296a, 298a and 302a (corresponding to the third, fourth, fifth and seventh bit) by leads 488, 490, 492, and 494, respectively. Normally, flip-flops 480a, 482a, 484a and 486a are inhibited until an enabling pulse appears on a lead 496 connected to another input to each of such flip-flops. An enabling pulse should appear on lead 496 only after the complete second prefatory character appears in flip-flops 294a, 296a, 298a and 302a of shift register 288a so as to isolate and store the second prefatory character information. Actually, the enabling pulse on line 496 is generated at the time when all eight bits are shifted into register 288a. For this purpose, an NAND gate 500 has its six inputs connected to lead 462, the inverted output $\bar{4}$ of divider 452, the inverted output $\bar{8}$ of divider 453, the inverted output $\overline{16}$ of divider 454, the inverted output $\overline{64}$ of divider 458, and the inverted output $\overline{128}$ of divider 460, respectively. Accordingly, the signal on output lead 502 of gate 500 has a single pulse occurring only for the entire interval of the second prefatory character of the entire message on incoming line 10a. However, to generate an enabling pulse on line 496 at the correct time, the signal on line 502 is gated with the "advance character" pulse on lead 360a through an NAND gate 504 and the output of gate 504 is connected to lead 496. Accordingly, flip-flops 480a, 482a, 484a and 486a are enabled to receive and store only the second prefatory character information on incoming line 10a.

The output of flip-flops 480a, 482a, 484a (the output going line address information) appears on leads 507a, 508a and 510a while the information YES (1) or NO (0) on output lead 512a from flip-flop 486a signifies whether or not a "carbon copy" is also to be sent on a manually selected one of the other output lines 12a to 12h.

As explained hereinbefore, one (only) of the standard outgoing message bit generators 284 (100 Baudot) or 286 (600 Fieldata) which is enabled by a signal level of one (only) of the flip-flops 96 to 104 or 150 to 158 is activated by the "dump" signal on lead 287, such enabling signal level established during "fill mode" being sustained during the subsequent "dump mode." The standard outgoing bit rate (100 Baudot or 600 Fieldata) on common lead 288 is connected to a second input of OR gate 317 so that shift register 288a when receiving stored character bits from memory system 320 is shifted at a desired bit rate by the signal on lead 306 connected to the output of gate 317.

Figure 9:
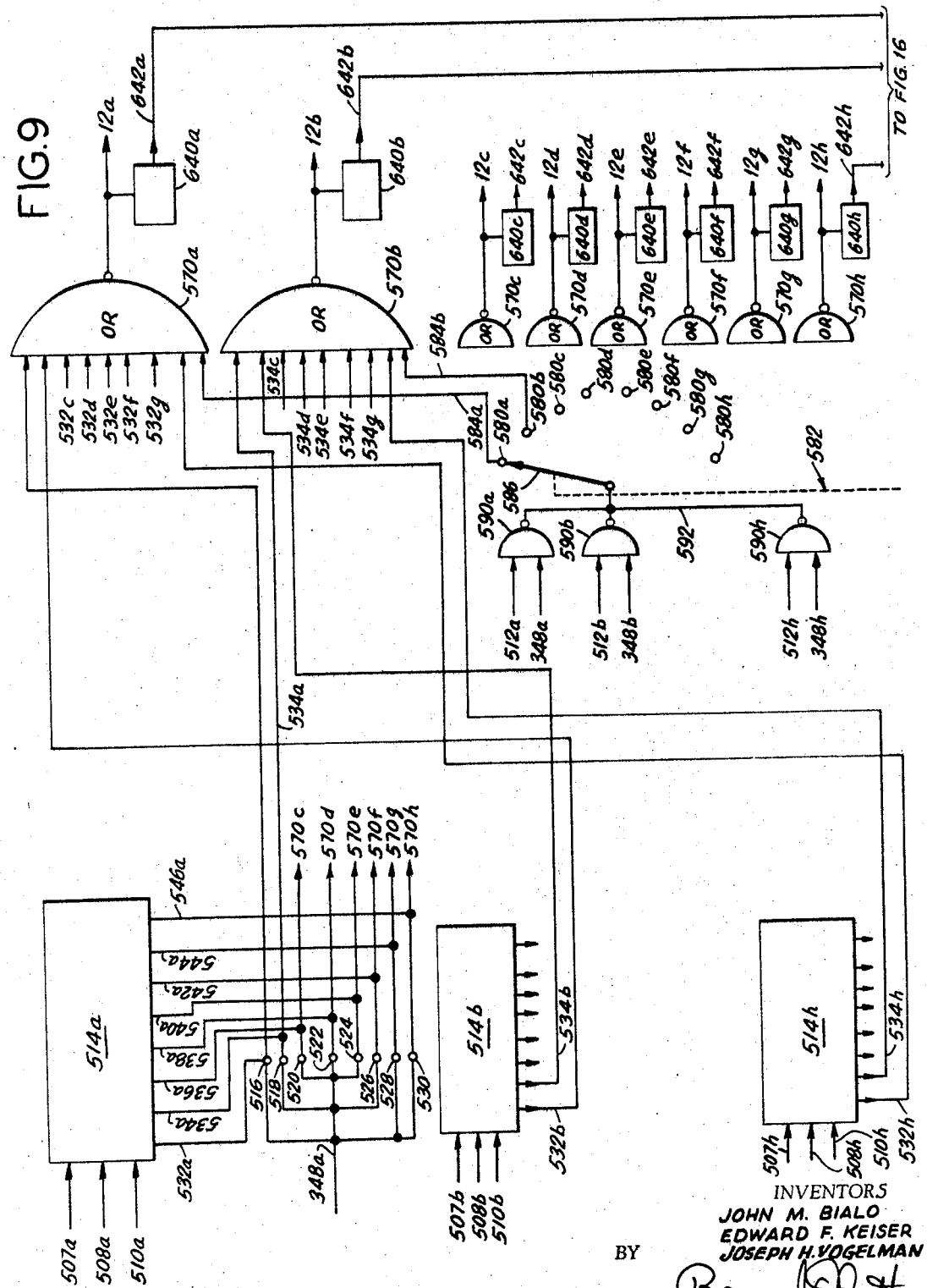
FIG. 9 illustrates the system according to the invention for automatically routing a message out of the memory system and onto a desired outgoing line with a "carbon copy" to another selected outgoing line.

As stated hereinbefore, the routing of the dumped message information is controlled by electronic switch 350 which will now be detailed in FIG. 9. In FIG. 9, the third, fourth, and fifth informational bit in the second prefatory character appearing on leads 507a, 508a and 510a of FIG. 8 are connected to the input side of a "Binary Number to Octal Number Encoder" 514a, for instance, Model OD–30 as manufactured and supplied by Computor Control Corp., Framingham, Mass. Encoders for two of the other seven channels are shown as 514b and 514h with input leads 507b to 510b and 507h to 510h, respectively. The eight output leads of encoder 514a are connected to eight terminals 516, 518, 520, 522, 524, 526, 528, and 530 by leads 532a, 534a, 536a, 538a, 540a, 542a, 544a and 546a, respectively. All of the terminals 516 to 530 are connected to lead 348a which is the message output lead from shift register 288a containing bit information for 128 characters in serial form. Since encoder 514a inhibits all of the terminals 516 to 530 except the one corresponding to the binary address information on leads 507a, 508a and 510a, only one of the leads 532a, 534a, 536a, 538a, 540a, 542a, 544a or 546a connected to terminals 516, 518, 520, 522, 524, 526, 528 and 530, respectively, will conduct the signals on lead 348a to the right hand portion of FIG. 9. For this disclosure, an assumption will be made that the message on incoming line 10a is to be routed to the outgoing line 12b and hence the third, fourth and fifth bits of the second prefatory character will be 0, 1, 0. Accordingly, when the "dump" signal is generated on lead 472a (to be explained later) the dumped message on lead 348a will appear only on lead 534a. It is to be understood that leads from the other seven encoders 514b to 514h corresponding to leads 532a to 546a for 514a will be designated with the same number but with a different suffix b to h for channels connected to incoming lines 12b and 12h.

FIG. 9 also illustrates eight similar OR gates 570a, 570b, 570c, 570d, 570e, 570f, 570g and 570h, each having nine inputs. Outgoing message lines 12a to 12h are connected to the output sides of gates 570a to 570h, respectively.

Each one of the first eight inputs to gate 570a is connected respectively to the first output lead 532a, 532b, or 532h of encoders 514a, 514b, . . . 514h. In like manner, each of the first eight inputs to second OR gate 570b is connected respectively to the second output lead 534a, 534b, . . . or 534h. Also, each of the first eight inputs to gates 570c to 570h is connected respectively to each of the third to eighth output terminals of encoders 514a to 514h. The ninth input terminal of each of the gates 570a to 570h is connected to terminals 580a to 580h of the first level of a two level ganged switch 582 by leads 584a, 584b, . . . 584h, respectively. Ganged switch 582 is manually prepositioned according to which of the outgoing lines 12a to 12h is to receive a "carbon copy." As shown in FIG. 9, the armature 586 is positioned in contact with contact 580a to signify that line 12a is to receive the "carbon copy" when the incoming message on line 10a is routed to outgoing line 12b (assumption made earlier in this disclosure).

Eight NAND gates 590a, 590b, . . . 590h are connected at their output sides to the armature 586 of the first level of ganged switch 582 by a lead 592. The two inputs to NAND gate 590a are connected to leads 512a and 348a, respectively. In similar fashion, the two inputs of gates 590b to 590h are connected to the leads 510b . . . 510h and 548b . . . 548h in the second to eighth channels (associated with incoming lines 12b to 12h) corresponding to leads 510a and 548a of the channel illustrated in FIG. 1a.

According to the circuitry in FIG. 9, the message dumped upon lead 348a is routed only to outgoing line 12b as determined by the coded signals on lead 510a which appear in the second prefatory character on incoming line 10a. Also, when the signal on lead 512a is a "YES" or a 1, to "open" gate 590a, the message appearing on line 348a is passed by gate 590c to lead 592, armature 586, contact 580a, lead 584a, OR gate 570a and output line 12a which has been chosen (assumed) to receive the "carbon copy." It will be noted that according to the circuitry of FIG. 9, any message in any of the other seven channels will also have a "carbon copy" sent to outgoing line 12a according to the one predetermined setting of ganged switch 582.

In explaining the message routing according to FIG. 9, it was assumed that the message was dumped upon lead 348a. However, the message signals from memory system 320 cannot be dumped upon lead 348a unless both the outgoing message line (12b as assumed) and the carbon copy lines (12a as assumed) are available, that is to say, not busy. It will now be explained in conjunction with FIG. 16 how the message consisting of 128 characters is not dumped upon line 348a unless both lines 12a and 12b are available.

Figure 16:
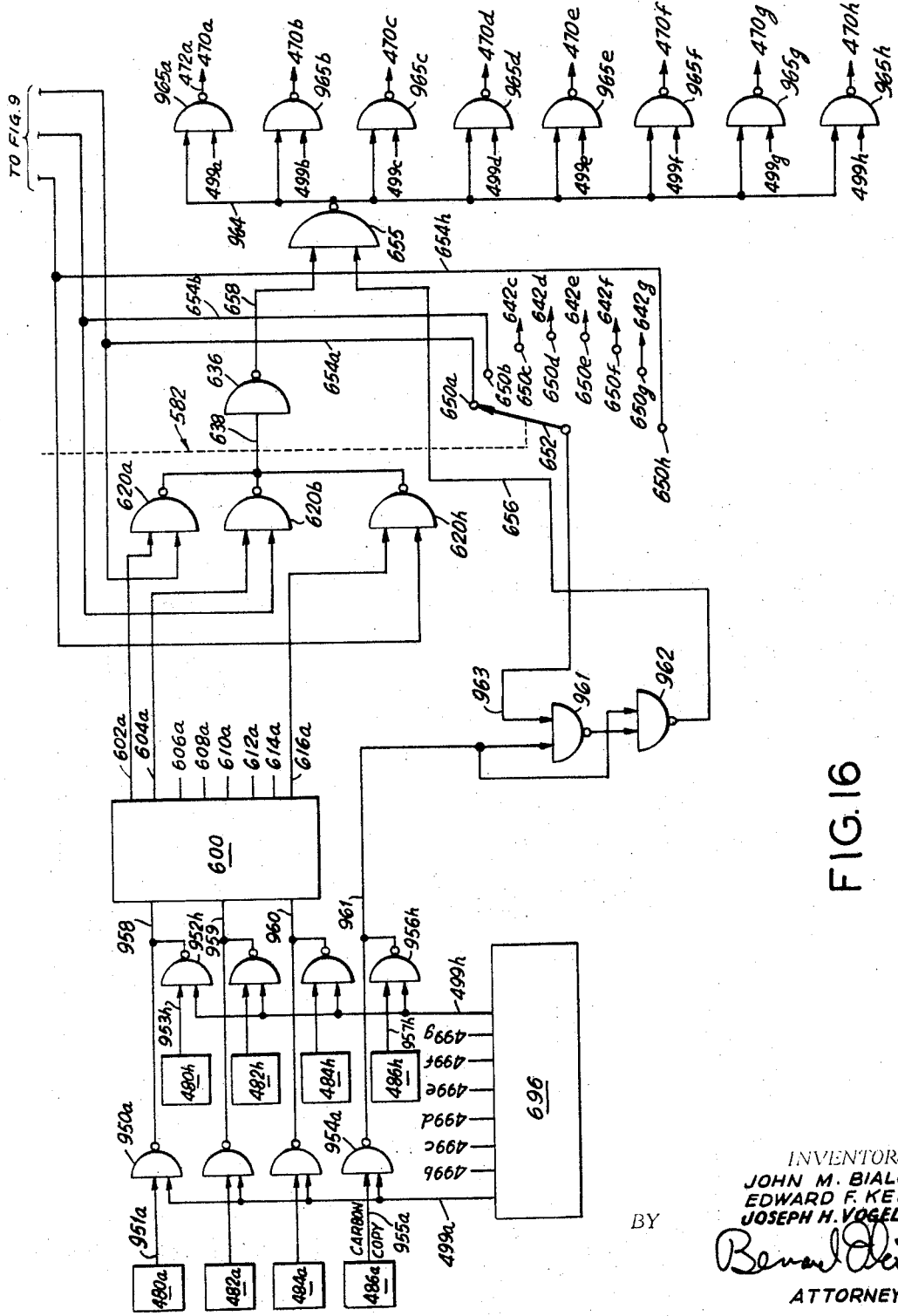
FIG. 16 illustrates an Outgoing Line Request Funnel for determining, on a line sharing basis, whether the desired outgoing line is available with or without simultaneous transmission of a "carbon copy" of the message.

FIG. 16 illustrates an Outgoing Line Request Funnel which determines whether (A) the desired outgoing line is available if no "carbon copy" is to be simultaneously dispatched therewith or (B) both the desired outgoing line and the "carbon copy" line are available when a "carbon copy" is to be simultaneously dispatched. Very importantly, such funnel as shown in FIG. 16 operates on a "time sharing basis" to reduce the number of components for handling the eight channels. Associated with the equipment of FIG. 16 is the master clock oscillator 62 (see FIG. 1a) which is common to all eight channels and four frequency dividers 680, 682, 684 and 686 which are connected in series to the output of 62 by a lead 688, divider 682 being connected to the output of divider 680 by a lead 690, divider 684 being connected to the output of divider 682 by a lead 692, divider 686 being connected to the output of divider 684 by a lead 694. A "Binary Number to Octal Number Encoder" 696 has its three inputs connected to leads 692, 694 and 698, the latter being connected to the output of divider 686. As established hereinbefore, when the master clock oscillator frequency is divided by 16 with four serially connected frequency dividers (such as 680, 682, 684 and 686), the resulting frequency is 93 microseconds or one clock count. Therefore, the sequential binary number inputs to encoder 696 on leads 692, 694 and 698 result in the sequential uninhibiting of each of the eight outputs 499a 499b, 499c, 499d, 499e, 499f, 499g and 499h of encoder 696 every one clock count, the uninhibiting pulses appearing on each of the eight output lines 499a to 499h at time spaced intervals of one-eighth of a clock count. Encoder 696 and its eight outputs 499a to 499h will be employed as common equipment to all eight channels and will be designated the "channel access counter."

In FIG. 16, there is illustrated only the four second prefatory character flip-flops 480a to 486a and 480h to 486h associated with the first and last channel and it will be assumed that the corresponding flip-flops and associated gates are present although not shown. Each flip-flops is connected to one input of a NAND gate, for instance: 480a is connected to one input of a gate 950a by a lead 951a; 480h is connected to one input of a gate 952h by a lead 953h; 486a is connected to one input of a gate 954a by a lead 955a, 486h is connected to one input of a gate 956h by a lead 957h, etc. Channel/encoder 696 of FIG. 1a is also shown in FIG. 16 with its 499a output lead connected to the second inputs of the four gates (including 950a and 954a) associated with channel 1 (incoming line 10a) and its 499h output lead connected to the second inputs of the four gates (including 952h and 956h) associated with channel 8 (incoming line 10h). The other six outputs 499b to 499g of 696 are similarly connected to 24 gates (not shown). The output of the eight gates, including 950a and 952h, associated with the first flip-flop, including 950a and 952h, of all eight channels are connected to a common lead 958. Similarly, common leads 959 and 960 are connected to the second and third gates, respectively, of all eight channels. Also, a common lead 961 is connected to all the fourth gates, including 954h and 956h, of all eight channels.

A "Binary Number to Octal Number Encoder" 600 (similar to 514a to 514h and 696) is common to all eight channels and has its three inputs connected to leads 958, 959 and 960. Accordingly, output leads 602a to 616a are sequentially (for a period of one-eighth of a count) uninhibited according to the address information of the first three bits in the second prefatory character on all eight incoming lines 10a to 10h.

Associated with each output lead 602a to 616a of encoder 600 is a NAND gate, such as 620a, 620b and 620h in FIG. 16, the other five gates being omitted from the drawing for simplicity's sake.

The inputs to gates 620a are connected to the first output terminal of encoder 600a and the output of flip-flop 640a on lead 642a, respectively. In similar fashion, one input to gate 620b is connected to output 604a of encoder 600a and the other input to gate 620b is connected to the output of flip-flop 640b. Also, one input of gate 620h is connected to the eighth output 616a of encoder 600a while the other input of gate 620h is connected to flip-flop 640h. The output of all eight gates (of the group consisting of 620a to 620h) are connected at their output sides to an inverter 636 by a lead 638.

For determining whether each of the outgoing lines 12a to 12h is busy or available, flip-flops 640a to 640h are connected individually to outgoing lines 12a to 12h (see FIG. 9). The output of flip-flops 640a to 640h assumes a 0 output when its associated line is busy or unavailable and a 1 signal when its associated line is not in use, such availability signals appearing on output leads 642a to 642h, respectively. A second level of ganged switch 582 comprises eight contacts 650a to 650h and a movable armature terminal 652. Fixed contacts 650a to 650h are connected to leads 642a to 642h by leads 654a to 654h, respectively.

The "time shared" line 961 having the "carbon copy" YES (1) or NO (0) information for all eight channels is connected to one input of each of two NAND gates 961 and 962. The output of gate 961 is connected to the other input of gate 962 while the other input to gate 961 is connected to armature 652 of ganged switch 582 by a lead 963. The output of gate 962 is connected to one input of a NAND gate 655 by a lead 656. The other input to gate 655 is connected to the output of inverter 636 by a lead 658. The output of NAND gate 655 is connected to lead 964 which is connected to one input of each of eight NAND gates 965a to 965h. The other inputs to gates 965a to 965h are connected to leads 499a to 499h of channel access encoder 696. The output of gate 965a is connected to gate 470a by a lead 472a (see FIG. 8). The other output leads 470b to 470h are connected to gates 470b to 470h in the other seven channels corresponding to gate 470a in the first channel. Accordingly, the information as to the availability of the desired outgoing lines and "carbon copy" lines appear sequentially on lines 470a to 470h for all eight channels on a time sharing arrangement (information appearing for one-eighth time count every one time count).

According to the assumption, the information in the second prefatory character is to route the message on incoming line 10a to outgoing line 12b with a "carbon copy" to line 12a. Accordingly, the "address" information on leads 507a, 508a and 510a uninhibits lead 604a (only) to place a 1 signal thereon. The other input to gate 620b is connected to the output of flip-flop 640b and when line 12b is available, the signal on lead 642b will be 1 to place a 0 signal on lead 638. Inverter 636 changes this 0 signal to yield a 1 signal to one input of gate 655. Also, if line 12a is available for the carbon copy, the signal on lead 642a from the output of flip-flop 640a will be a 1 and such signal will appear on lead 654a, contact 650a, armature 652 and lead 963. Since the output of flip-flop 486a is 1 (corresponding to YES for a "carbon copy") NAND gate 961 has a 0 signal output and this signal gates in 962 with the 1 signal on lead 961 to yield a 1 signal from NAND gate 962 on lead 656 going to the other input of gate 655. NAND gate 655 receiving a 1 signal on each of its inputs, yields a "lines available" signal to leads 964 and 472a and not to leads 470b to 470h as controlled by the synchronization influence of channel access encoder 696. According to the assumptions, the "lines available" signal on lead 472a in conjunction with signals on the other inputs (462 and 466) to gate 470a initiates the dumping of the stored message onto lead 348a because we have satisfied the three necessary conditions: (1) that 130 characters have been counted in the message; (2) that the outgoing message line is available and not busy; and (3) that the "carbon copy" line is available and not busy when the seventh bit in the second prefatory character signifies that a carbon copy should be sent.

It will be observed that the circuitry of FIG. 16 merely determines whether the desired output line is available if flip-flop 486a (and the seventh bit in the second prefatory character) does not require a "carbon copy" by placing a 0 signal on lead 961. Regardless of whether or not line 12a is busy, the 0 signal on one input of NAND gates 961 and 962 places a 1 signal on the output of 961 and on lead 656 so that gate 655 is responsive only to the signal on lead 658.

As mentioned hereinbefore, memory system 320 is divided into eight channels (for illustrated purposes only) 322, 324, 326, 328, 330, 332, 334 and 336, each channel accumulating one message as it appears on one of the incoming lines 10a to 10h. As disclosed hereinbefore, the message character bits of the eight incoming message lines 10a to 10h all appear on lines 340a to 340h on a "time sharing basis" as arranged by data input funnel commutator 338. Accordingly, there is provided a word location funnel 400 which routes the character bits on lines 340a to 340h to its assigned message storage section 322 to 336.

Figure 10:
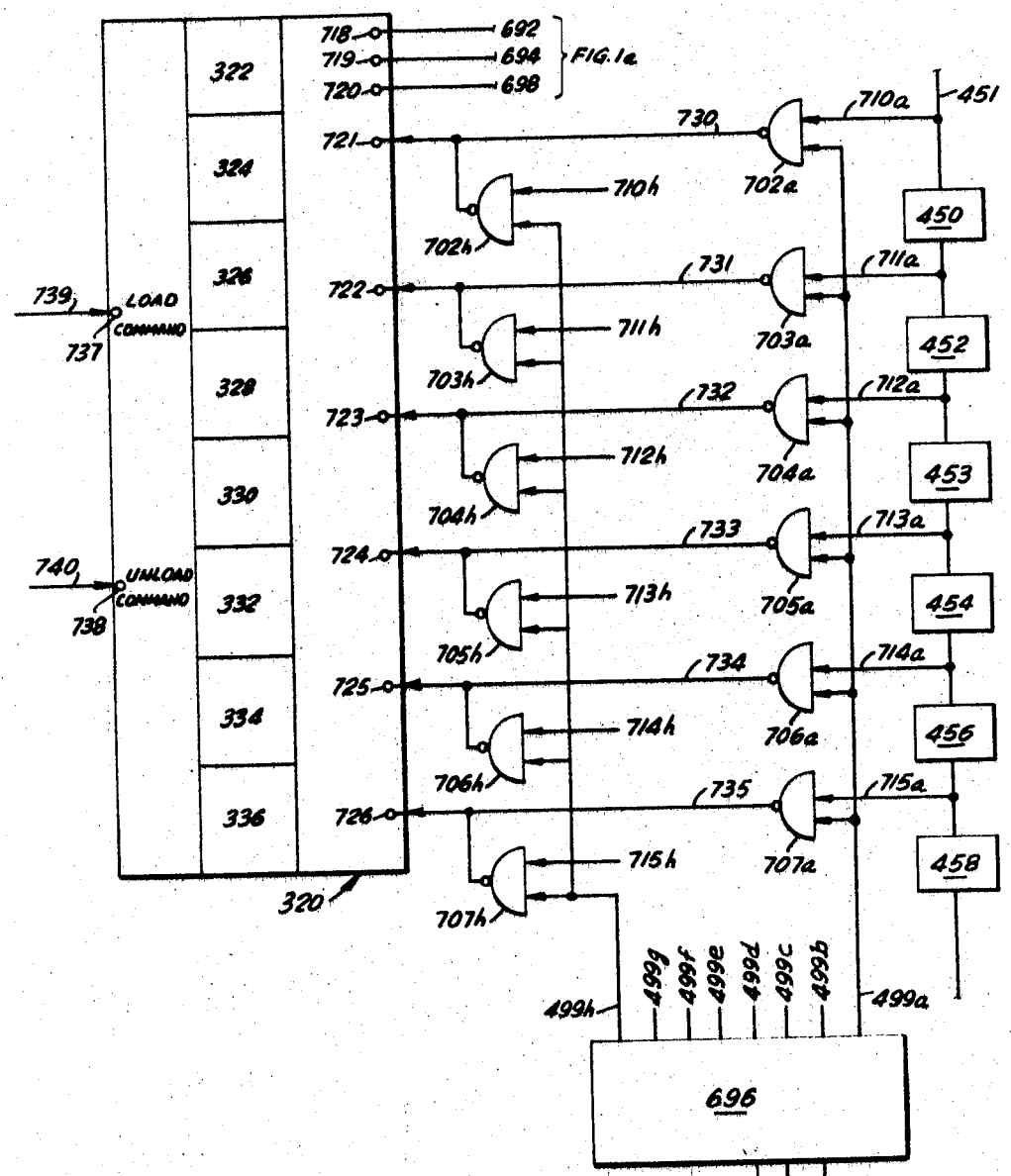
FIG. 10 illustrates a word locator funnel for the memory system illustrated in FIG. 8 according to the invention.

One embodiment of the word locator funnel 400 is illustrated in FIG. 10 which includes encoder 696 of FIG. 1a and character counter dividers 449 to 460 of FIG. 8. As shown in FIG. 10 for the channel illustrated in FIG. 1a, there are provided six NAND gates 702a, 703a, 704a, 705a, 706a and 707a, each having one input connected to output terminal 499a of encoder 696. The other input terminals of each of gates 702a to 707a are connected to lead 451, output of 450, output of 452, output of 453, output of 454 and output of 456 by leads 710a, 711a, 712a, 713a, 714a and 715a, respectively.

Memory system 320 has nine word locator input terminals 718 to 726. The first three input terminals 718, 719 and 720 are connected to leads 692, 694 and 698 (FIG. 1a) which receive counting pulses from frequency dividers 680 to 686, such counting pulses in binary form counting 1 to 8 and repeating for each one clock count. Accordingly, the message character bits on any one of the incoming lines 10a to 10h are routed in one-eighth of a clock count into its associated memory section 322 to 336 in accordance with the channel number 1 to 8 appearing in binary form on lines 692, 694 and 698.

The next fourth to the ninth word locator input terminals 721 to 726 of memory system 320 are connected to the output of gates 702a, 703a, 704a, 705a, 706a and 707a by leads 730, 731, 732, 733, 734 and 735, respectively.

In similar manner, six NAND gates, corresponding to 702a to 707a, are provided for each of the other seven channels connected to the other input message lines 10b to 10h (only 702h to 707h for the eighth channel being shown in FIG. 10), one input of each group of six gates being connected to one output 499b to 499h of encoder 696, respectively, while the other input to each group of six gates being connected to its respective character counter corresponding to dividers 450 to 458. The output of the first gates (including gate 702h) of each group of six gates associated with each of the other seven channels are connected to lead 730 while the output of second gates (including gate 703h) of each group of six gates is connected to lead 731. This pattern is repeated until the output of the sixth gates (including gate 707h) are connected to lead 735. Accordingly, input terminals 721 to 726 of memory system 320 each receive, for one-eighth of a clock count, the counting pulses according to the actual message character rate on all the eight channels, such counting pulses in binary form counting 1 to 128 and repeating. Memory system 320 responds to the combination of the repeating count 1 to 8 (over a one count period) and 1 to 28 (at the actual message character count) on terminals 718 to 720 and 721 to 726, respectively to properly locate the message characters in the sequence of memory sections 322 to 336 even though each section has a different number of stored characters in different states of "fill" and "dump."

Memory system 320 also requires an energization of either the "load command" terminal 737 or the "unload command" terminal 738 simultaneously with the signals appearing on terminals 721 to 726 of FIG. 10, so that the message characters may be received from lines 340a to 340h or may be dumped from one of the memory sections to lines 342a to 342h. Terminal 737 or 738 is energized by leads 739 or 740 connected to the "Load/Unload Funnel" 370.

Figure 11:
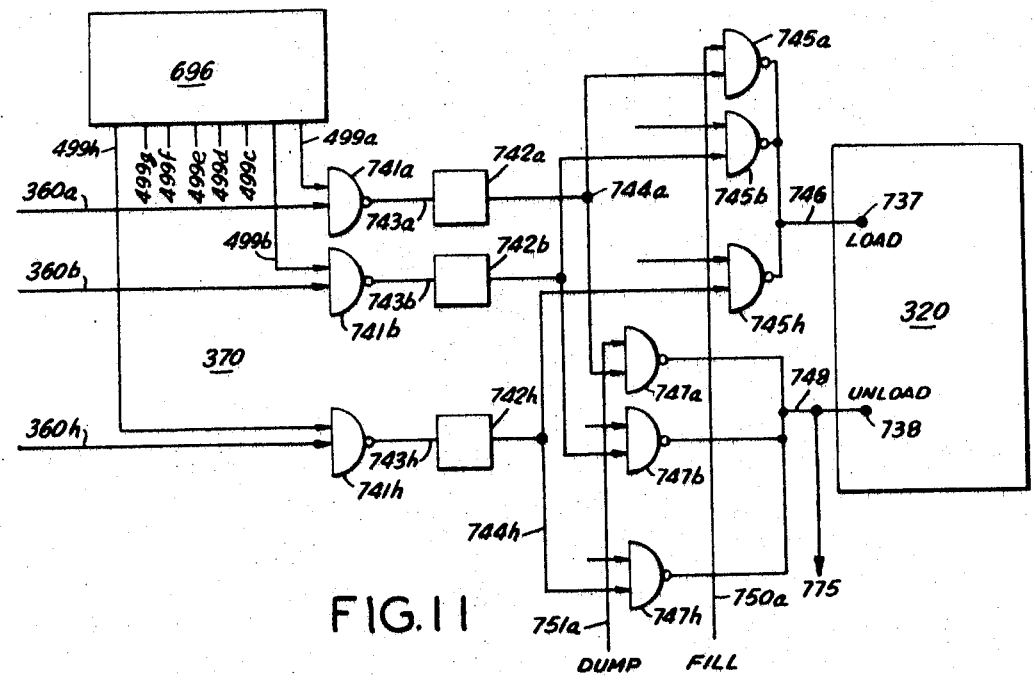
FIG. 11 represents a load/unload funnel for the memory system of FIG. 8 according to the invention.

FIG. 11 illustrates one embodiment of the Load/Unload Funnel 370 according to the invention. Funnel 370 includes encoder 696 of FIG. 1a which is connected to frequency dividers 680 to 686 and master clock oscillator 62. As shown in FIG. 11, there is provided eight NAND gates 741a to 741h (only three being illustrated), each having one input connected to one of the outputs 499a to 499h of encoder 696. The other input of gate 741a is connected to the "advanced character" pulse line 360a of FIG. 8. In similar manner, the other inputs to gates 741b to 741h are connected to the lines 360b to 360h corresponding in the seven other channels to line 360a in FIG. 8. The outputs of gates 741a to 741h are connected to delay multivibrators 732a to 742h by leads 743a to 743h. Upon the occurrence of simultaneous signals at both inputs to each of the gates 741a to 741h, a selected one of the transitions on leads 743a to 743h yields a corresponding pulse of a desired width on output leads 744a to 744h of 742a to 742h. Load/Unload Funnel 370 also comprises eight NAND gates 745a to 745h (only three illustrated), each having their outputs connected to "load command" terminal 737 of memory system 320 by the lead 746. Also, eight NAND gates 747a to 747h (only three illustrated), each have their outputs connected to the "unload command" terminal 738 of memory system 320 by the lead 748. Output lead 744a of multivibrator 742a is connected to one input of gate 745a and one input of gate 747a. In similar manner, lead 744b is connected to one input of the second gate 745b of the first mentioned group of gates 745a to 745h and an input of the second gate 747b of the second mentioned group of gates 747a to 747h. Similarly, the outputs of all the other six multivibrators (including 742h) is connected to one input of one gate (such as 745h) from the first mentioned group of gates and an input to another gate (such as 747h) of the second mentioned group of gates. The other input to gate 745a is connected to a lead 750a which receives an enabling voltage from FIG. 8 (to be explained later) whenever one of the memory sections 322 to 336 associated with incoming line 10a has received less than 130 characters from line 340a. The other input to gate 747a is connected to a line 751a to receive an enabling voltage from FIG. 8 (to be explained later) whenever the same memory sections 322 to 336 associated with incoming line 10a is dumping the message therefrom on line 342a. It is to be understood that there are seven more "fill" lines (not shown) to each of the seven other channels corresponding to line 750a as well as seven other dump lines for the seven other channels corresponding to line 751a, such other fourteen lines being connected to equipment in the seven other channels corresponding to FIG. 8. Since either line 750a or 751a is energized with an enabling voltage (depending upon whether its corresponding memory section is "filling" or "dumping") only one of the terminals 737 or 738 will be energized to provide the proper command signal to the memory system 320. That is to say, only one of the sixteen gates 745a to 745h and 747a to 747h will be yielding signals at any one time and that each of the memory sections 322 to 336 can either be "filling" or "dumping" according to the signals on terminals 737 and 738 as synchronized by channel access encoder 696.

The energization of "fill" line 750a and "dump" line 751a will now be described with reference to FIG. 8. In FIG. 8, there is provided a dump flip-flop 660 having its "set" terminal 662 connected to the output of gate 470a through lead 287, delay multivibrator 663 and lead 664 while its "reset" terminal 665 is connected to the output of a NAND gate 666. Since a signal will be generated on lead 287 at the output side of gate 470a when 130 characters will be counted on the way into any one of the memory sections 322 to 336 and when both the desired outgoing line 12a . . . or 12h and the "carbon copy" line is available, the output of flip-flop 660 on lead 751a connected thereto will energize the "unload command terminal" 738 (FIG. 11) after all such conditions are satisfied to commence the outgoing transmission of the stored message. It is to be understood that a stored message of 128 characters in one of the memory sections 322 to 336 may not be dumped for a considerable time after the 130th character is received therein since either the desired outgoing line or the "carbon copy" line is busy with another message. Also, as shown in FIG. 8, one input to a gate 666 is connected to line 466 which counts 128 characters while the other input to gate 660 is connected to line 751a. Hence, if the signal on the output of flip-flop 660 is 0 to indicate that its associated memory section is either in the "filling" state or in the "awaiting dumping" state, gate 666 is "closed" to prevent resetting of flip-flop 660 when 128 characters are countered in the "fill" mode. However, when the associated memory section starts to dump, gate 666 "opens" and remains open while line 466 counts 128 dumped characters. After the 128th character is dumped, the signal on line 466 is conducted through gate 666 to terminal 665 for resetting flip-flop 660 to "close" the gates 747a to 747h (FIG. 11) and thereby to remove the "unload command signal" on terminal 738 of memory system 320.

For energizing the "fill" lead 750a, there is provided in FIG. 8 a delay multivibrator 667 which responds to the positive going transition when flip-flop 660 is reset by the signal on terminal 665 from 466 through gate 666 which indicates the end of the dumping period. Delay multivibrator 667 provides an "end dump" pulse of desired width on output lead 668 which is connected to the "set" terminal 669 of a "fill" flip-flop 670 to place a "fill" command signal on lead 750a. Accordingly, after 128 characters are dumped from its associated memory section, the "end of dump" transition on lead 750a is commutated to "load command" terminal 737 of memory system 320. For resetting the fill flip-flop 670, there is provided a NAND gate 671 which has one input connected to lead 462 and another input lead connected to lead 466, the output of gate 671 being connected to the reset terminal 672 of flip-flop 670 through a lead 673, a delay multivibrator 674 and a lead 675. Accordingly, when gate 671 counts 130 characters passing into its associated memory section, fill flip-flop 670 is "reset" by an "end of fill" transition on lead 675 to remove the load command signal on terminal 737 of memory system 320.

In connection with FIG. 12, there will now be described one embodiment of data input funnel 338 which commutates the parallel output lines of all of the shift registers, such as 288a in FIG. 8, so that the message character bits on all the incoming lines 10a to 10h appear on the common parallel lines 340a to 340h on a time sharing basis. As shown in FIG. 12, data input funnel 338 includes encoder 696 of FIG. 1a and all of the shift registers, such as 288a of FIG. 8, associated with all of the incoming message lines 10a to 10h. For simplifying FIG. 12, only two (288a and 288h) of the eight shift registers are illustrated. For the data input funnel 338, eight NAND gates are provided for each shift register, one NAND gate being associated with each of the eight bit flip-flops in each shift register 288a to 288h. One input to each of eight NAND gates 755a to 762a is connected to the output lead 364a to 378a of flip-flops 290a to 304a, respectively. The other input to each of the gates 755a to 762a is connected to output terminal 499a of encoder 696 by a lead 763a. Also, one input to each of the NAND gates 755h to 762h is connected to an output lead 364h to 378h of flip-flops 290h to 304h, respectively, while the other inputs to gates 755h to 762h are connected to output terminal 499h of encoder 696 by a lead 763h. Similarly, the other six shift registers 288b to 288g (not shown) are each connected through groups of eight NAND gates to the terminals 499b to 499g of encoder 696. The outputs of the eight gates 755a to 755h are connected to lead 340a going to memory system 320. Similarly, the outputs of gates 756a to 756h, 757a to 757h, 758a to 758h, 759a to 759h, 760a to 760h, 761a to 761h and 762a to 762h are connected to the input side of memory system 320 by leads 340b, 340c, 340d, 340e, 340f, 340g and 340h, respectively. Accordingly, it can be seen that each of the data input leads 340a to 340h to memory system 320 is common to the eight shift registers 288a to 288h on a time sharing arrangement according to the sequential uninhibiting of the terminals 499a to 499h of channel access encoder 696, such sequential uninhibiting opening up, in turn, but one of the eight gates connected to each of the lines 340a to 340h. Clearly, any number from one to all shift registers can be filling memory system 320 at the same time as a result of the commutating operation.

The output data funnel 346 which is employed to dump the message character bits from any section 322 to 336 of memory system 320 back to its associated shift register (288a to 288h) is illustrated in FIG. 13. Funnel 346 includes channel access encoder 696 and the eight shift registers 288a to 288h. Each of the output leads 342a to 342h of memory system 320 is connected to one input of a three input NAND gate 765a, 766a, 767a, 768a, 769a, 770a, 771a and 772a. The outputs of each of the gates 765a to 772a on leads 402a to 416a are connected to flip-flops 290a to 304a of shift register 288a, all as shown also in FIG. 8. Another input to each of the gates 765a to 772a is connected to output lead 499a of encoder 696. Similarly, eight three-input NAND gates are connected to each of the other seven shift registers, FIG. 13 showing (only) NAND gates 765h to 772h connected at their output sides to the eighth shift register 288h. One input to all of the gates 765h to 772h is connected to output lead 499h of encoder 696. Another input of gates 765h to 772h is connected to output leads 342a to 342h of memory system 320, respectively. All of the sixty-four gates 765a to 772h have a third input connected through a delay line 775 to the "unload command" output lead 748 of the load/unload funnel 370 in FIG. 11, FIG. 13 showing such connections only to gates 765a to 772a and 765h to 772h for illustrative purposes only. Accordingly, an enabling unload command signal on lead 748 prepares funnel 346 for its dumping operation. Delay line 775 delays the unload command signal to the Data Output Funnel 346 by a small interval, say six microseconds, equal to the time required for the stored character bits in memory system 320 to reach gates 765a to 772h after memory systems 320 receives an unload command. The third input to NAND gates 765a to 772h is required since the common output lines 342a to 342h are constantly energized by the data stored in the memory sections 322 to 336. At all times, any or all of the shift registers 288a to 288h are sharing the data output lines 342a to 342h of memory system 320 as determined by the sequential uninhibiting of the output leads 499a to 499h of encoder 696.

As illustrated in FIGS. 10, 11, 12 and 13, encoder 696 is common to the word locator funnel 400, load/unload funnel 370, data input funnel 338 and data output funnel 346 and therefore all commutation operations of such four funnels are maintained in synchronism by the common use of the output terminals 499a to 499h of encoder 696 which are uninhibited in a sequential manner repeating every one clock count. By such an arrangement, the memory sections 322 to 336 can be simultaneously loading or unloading.

Shift pulses on line 306 to shift register 288a should be generated at the end of each gate interval generated on lines 160 to 168 (Baudot) and 130 to 138 (Fieldata) so that a slightly delayed message bit can still be accepted into shift register 288a. That is to say, if the message signals on incoming line 10a is in 600 Fieldata, a gating interval terminating at 20 counts is generated on line 132 although each bit signal is normally expected at count 18. For accommodating late pulses, the shift pulses should be generated on lead 306 at count 20.

As explained hereinbefore, the clock is started at the beginning of each Baudot character and is stopped at the end of each Baudot character since the characters are normally intermittant in Baudot code. On the other hand, the clock is opened and remains open for the entire message in Fieldata since there is no intermittancy between characters in such code. For maintaining synchronization in a Fieldata message, the counter chain network 72a to 72m is reset by a isgnal generated at the nominal bit rate of the incoming Fieldata code. Such timing signal is discarded or overridden when a 1 appears in the Fieldata message but is available when a 0 appears in the Fieldata code to reset the clock. The clock is also reset at the nominal bit rate of a single character for an incoming Baudot mesage. Further, as hereinbefore stated, the shift transitions on line 312 (FIG. 2) for both Fieldata and Baudot messages are generated a predetermined time interval after the nominal or expected time when a message bit arrives or is expected. Circuits for generating the synchronizing pulses and the shift pulses will now be described with reference to FIG. 14.

Figure 14:
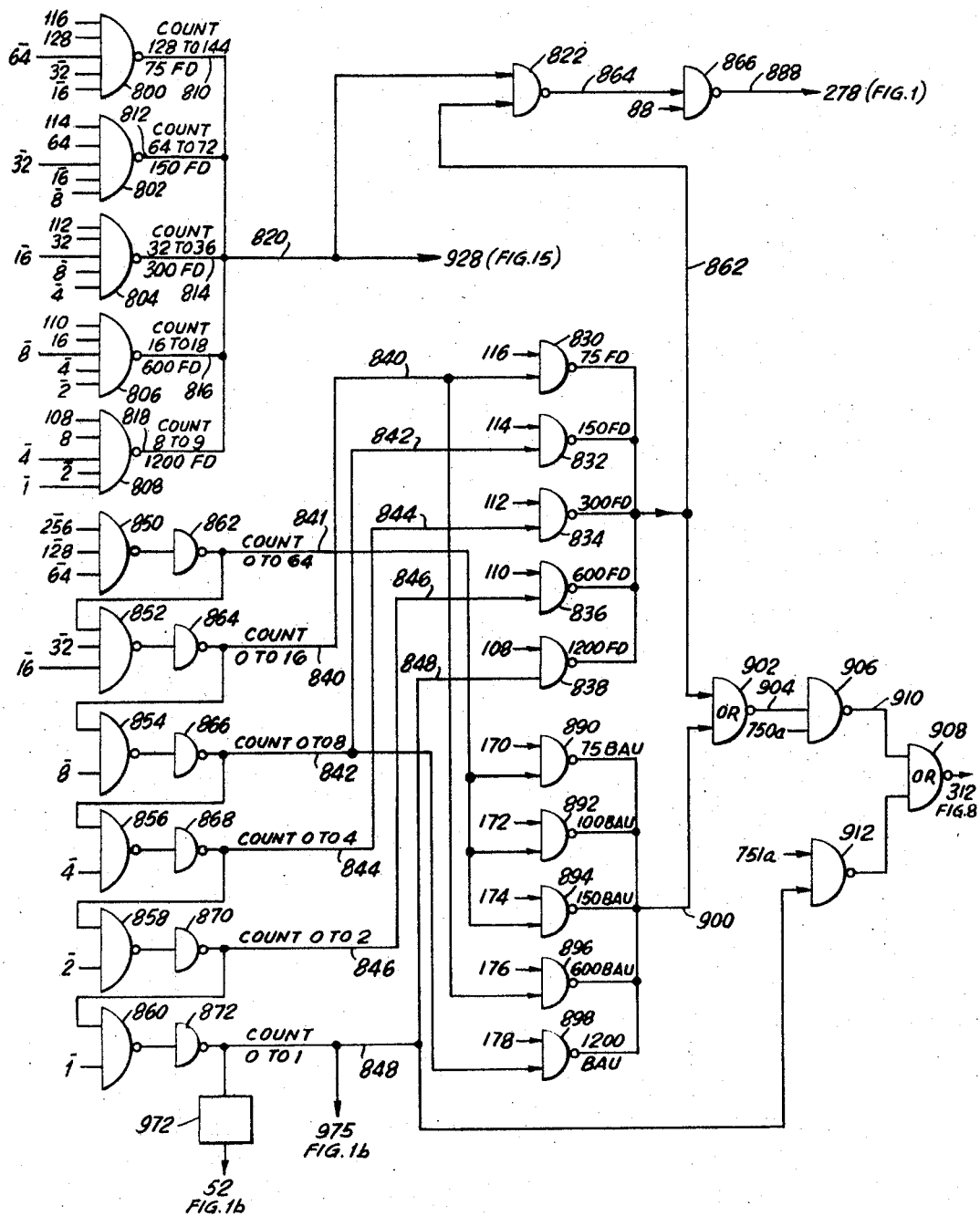
FIG. 14 illustrates the establishment of "early" gates for Fieldata and the "late" gates to generate shift pulses and to synchronize the resetting of the counter chain network of FIG. 1a according to the invention.

For resetting the clock every time a 1 signal appears in a Fieldata incoming message, there is provided five NAND gates 800, 802, 804, 806 and 808 as shown in FIG. 14 for generating gate intervals having a terminating transition at the nominal bit rates of 75 Fieldata, 150 Fieldata, 300 Fieldata, 600 Fieldata and 1200 Fieldata, on output leads 810, 812, 814, 816 and 818, respectively. The inputs to the gates 800 to 808 are connected to counter chain network flip-flops 72d to 72m (FIG. 1a) according to the indicated symbolism. Leads 810 to 818 are connected to a common lead 820 which is connected to one input of a NAND gate 822. It will be noted that the gating intervals generated on leads 810 to 818 terminate at the nominal bit rate to create an "early" gate which is the first portion of the detection gates generated on leads 138 to 130 of FIG. 1b. A "late" gate making up the balance of the gate intervals on leads 138 to 130 is generated by NAND gates 830, 832, 834, 836 and 838. One input to gates 830, 832, 834, 836 and 838 is connected to leads 116, 114, 112, 110 and 108 (Fieldata identifiers) in FIG. 1b so that one and only one of such gates is open according to the incoming message code type on incoming line 10a. The other input to such gates is connected to leads 840, 842, 844, 846 and 848 upon which are generated the "late gates" corresponding to the counts 0 to 16, 0 to 8, 0 to 4, 0 to 2 and 0 to 1, respectively. Another lead 841 has generated thereon a late gate interval of the count 0 to 64 and will be employed in connection with Baudot coded messages.

The late gate intervals on lines 841 to 848 are generated by NAND gates 850, 852, 854, 856, 858 and 860 having their inputs connected to the counter chain network flip-flops 72d to 72m in FIG. 1a according to the symbolism hereinbefore explained. The output of gates 850, 852, 854, 856, 858 and 860 are connected to leads 841, 840, 842, 844, 846 and 848 through inverters 862, 864, 866, 868, 870 and 872, respectively. Also, as shown in FIG. 14, lead 841 is connected to one input of gate 852, lead 840 is connected to one input of gate 854, lead 842 is connected to one input of gate 856, lead 844 is connected to one input of gate 858 and lead 846 is connected to one input of gate 860. Assuming that the incoming message on line 10a is in 600 Fieldata, an early gating interval of 16 to 18 will be generated on lead 820 while a late gate interval of 0 to 2, starting at the end of the early gate at count 16, will be generated on a lead 862 which is connected to the output of all of the gates 830 to 838. Accordingly, NAND gate 822 which is connected at its input side to leads 820 and 862 will have generated on its output lead 864 a gate interval of 16 to 20. The signal on lead 864 is gated with the signal on lead 888 of FIG. 1a (having a signal corresponding to the second transition in the first pulse) through a NAND gate 866 so that a pulse appears on output lead 888 of gate 866 only when the second transitions of incoming mesage bits in Fieldata occurs during the entire gate interval (early plus late) on lead 864. Lead 888 is connected to one input of the clock reset generator 278 in FIG. 1a to reset and synchronize the clock every time a 1 signal appears in Fieldata code.

FIG. 14 also illustrates the generation of shift transitions on line 312 in FIG. 8 for both incoming Fieldata and Baudot coded messages. The gate intervals generated at the output side of gates 830, 832, 834, 836 and 838 represent a terminating transition 0 to 16 counts after the nominal 144 counts for 75 Fieldata, a terminating transition 0 to 8 counts after a nominal bit interval of 72 counts for 150 Fieldata, a terminating transition 0 to 4 counts after a nominal bit interval of 36 coutns for 300 Fieldata, a terminal transition 0 to 2 counts after a nominal bit rate interval of 18 counts for 600 Fieldata and a terminal transition 0 to 1 count after a nominal bit rate of 9 counts for 1200 Fieldata, respectively. Such terminal transitions establish the end of the "late gate interval" at which time it is desired to shift the shift register 288a to accommodate, within preselected tolerances, Fieldata signals which arrive late.

Different from Fieldata, the voltage levels representing Baudot characters are shifted into the shift register 288a during memory fill a preselected time (approximately one-half the bit period) after time ZERO which is continuously re-established at the nominal bit rate as counter chain dividers 72a to 72m are reset to ZERO by self synchronization pulses.

Figure 15:
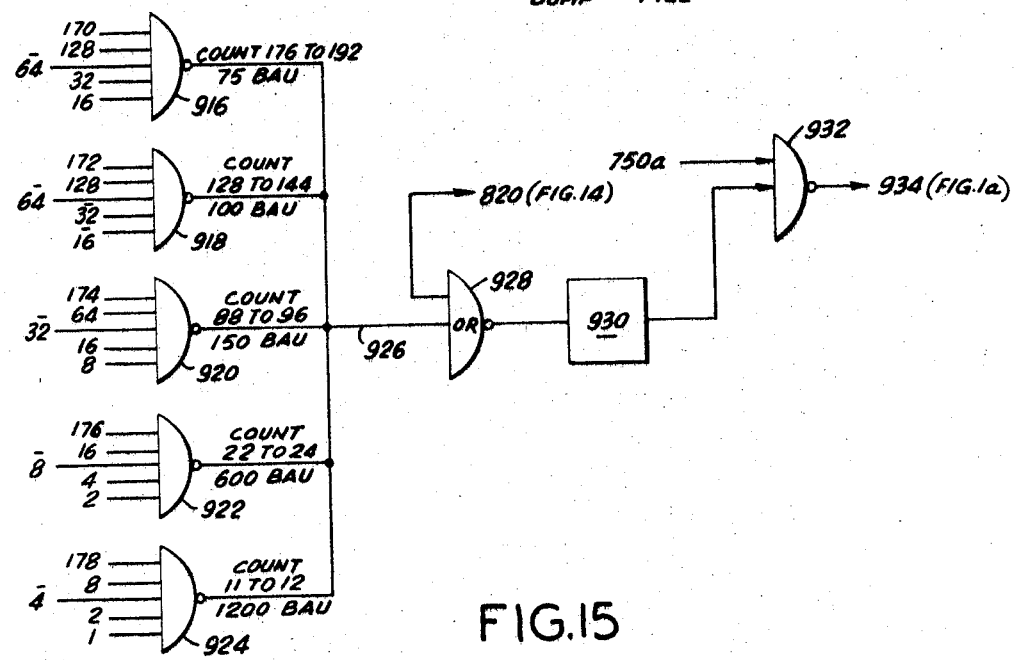
FIG. 15 illustrates the establishment of "early" gates for Baudot messages to synchronize the resetting of the counter chain network of FIG. 1a according to the invention.

The gates 142a to 142i and 142k to 142m associated with 75 Baudot, 100 Baudot, 150 Baudot, 600 Baudot and 1200 Baudot codes in FIG. 1a provide intervals of 352 to 416 counts, 256 to 320 counts, 176 to 208 counts, 44 to 52 counts and 22 to 26 counts on leads 160, 162, 164, 166 and 168, respectively, such gating intervals representing the interval of the first two bits of the first Baudot character as shown in FIG. 3. For generating self-synchronization pulses during memory fill by Baudot characters, it is necessary to generate gating intervals having a terminal transition equal to the nominal bit rate: 192 counts for 75 Baudot, 144 counts for 100 Baudot, 96 for 150 Baudot, 24 for 600 Baudot and 12 counts for 1200 Baudot. Accordingly, there is shown in FIG. 15 NAND gates 916, 918, 920, 922 and 924 having inputs connected to flip-flops 72d to 72k and flip-flops 150 to 158 of FIG. 1b according to the symbolism hereinbefore explained to generate gating intervals 176 to 192 for 75 Baudot, 128 to 144 for 100 Baudot, 88 to 96 counts for 150 Baudot, 22 to 24 counts for 600 Baudot and 11 to 12 for 1200 Baudot, respectively, terminal transitions representing the nominal bit rates. All of the outputs of gates 916 to 924 are connected to a common lead 926 upon which there is generated one gating interval corresponding to the Baudot incoming message on line 10a. Leads 820 from FIG. 14 (upon which is impressed a gating interval according to the Fieldata message on incoming line 10a) and 926 are connected to the input side of an OR gate 928. The output of OR gate 928 is connected to the input side of a delay multivibrator 930 which is responsive to the positive going transitions corresponding to the terminal transition of the gate interval on lead 926 (Baudot) or 820 (Fieldata), such terminal transitions representing the nominal bit rate of the incoming messages. The output of delay multivibrator 930 is connected to one input of a NAND gate 932 to which is also connected lead 750a of FIG. 8, the latter receiving signals to open gate 932 during the "fill mode" only. Accordingly, the output of gate 932 on lead 934 has impressed thereon self-synchronizing pulses occurring at the nominal bit rate of the incoming message on line 10a, either in Baudot or Fieldata code, and when line 934 is connected to another input of clock reset generator 278, the clock is reset at the nominal bit rate. As explained hereinbefore, the self-synchronizing pulses for the Fieldata code are discarded by the occurrence of 1 signals so long as they occur within preselected tolerances of the nominal bit rate.

For shifting Baudot messages into the shift register 288a at a preselected time (approximately one-half the bit period) after the counter chain dividers 72a to 72m are repeatedly set to ZERO by the self-synchronizing pulses, there is provided in FIG. 14 NAND gates 890, 892, 894, 896 and 898 having outputs to represent 75 Baudot, 100 Baudot, 150 Baudot, 600 Baudot and 1200 Baudot, respectively, all connected to a common output lead 900. One input to gates 890, 892 and 894 is connected to lead 841 having generated thereon a late gate interval 0 to 64 counts. One input to gate 896 is connected to lead 840 which has generated thereon a late gate interval 0 to 16 counts. Also, one input to gate 898 is connected to lead 842 which has generated thereon a late gate interval 0 to 8 counts. Also, another input to gates 890, 892, 894, 896 and 898 is connected to leads 170, 172, 174, 176 and 178 of FIG. 1b so that only one of the gates 890 to 898 is open according to the identification of the incoming Baudot message. Accordingly, there is generated on lead 900 a terminating transition 64 counts after each time ZERO as established by self-synchronizing pulses at the nominal bit rate of 192, 144 and 96 counts for 75 Baudot, 100 Baudot, and 150 Baudot, respectively; a terminating transition 16 counts after each time ZERO occurring at the nominal bit interval of 24 counts for 600 Baudot; and a terminating transition 8 counts after each time ZERO occurring at the nominal bit rate of 12 counts for 1200 Baudot. The output of gates 890 to 898 are employed to generate shift pulses which occur at a preselected time 64, 64, 64, 16 and 8 counts after the message transition in 75 Baudot, 100 Baudot, 150 Baudot, 600 Baudot and 1200 Baudot message bits so as to avoid the electronic disturbance at the transition point.

Leads 862 and 900 are connected to inputs of an OR gate 902 having an output lead 904 connected as one input to a NAND gate 906. The other input to NAND gate 906 is connected to lead 750a which opens gate 906 when the associated channel is in "fill" mode. The output of gate 906 is connected to one input of an OR gate 908 by a lead 910. Lead 312 of FIG. 8 is connected to the output side of gate 908 to receive the shift transitions by either the incoming Baudot message or the incoming Fieldata message.

During "dumping mode," message characters as stored in memory system 320 are channeled through the data output funnel 346 before reaching the shift register 288a (for the second time). Hence, it is desirable to slightly delay the shifting pulses during dump mode to assure that the stored message characters have adequate time to reach the shift register 288a. Accordingly, FIG. 14 provides a 1 count delay during the "dump" mode. Specifically, a NAND gate 912 has one input connected to lead 751a which opens the gate 912 at the moment when the dump mode is commenced. The other input to NAND gate 912 is connected to lead 848 for receiving a gate interval of 0 to 1 count and thereby the shift signals during dump are delayed by one time count.

In connection with the description of the operation of FIG. 1, it was explained that flip-flop 61 started the clock at the beginning of each Baudot character by receiving a "start of sequence" pulse from the first transition of the first character on lead 58 through OR gate 56 and lead 57. Subsequently flip-flop 61 is reset to stop the clock by a signal on lead 276 at the end of an incoming Baudot character through OR gate 274 and lead 278 as controlled by the advance character pulses on line 360a which is connected to one input of a three-input NAND gate 680. Another input to NAND gate 680 is lead 266 (Baudot code identifier) and the output of gate 680 is connected to lead 276. In order to prevent resetting of flip-flop 61 during "dump" mode, a third input to gate 680 is connected to lead 750a which signals "fill mode."

It will now be explained how flip-flop 61 is set at the beginning of the second Baudot character to start the clock again by a signal on lead 938 connected to a second input of OR gate 56. As shown at the left side of FIG. 1a, a five-input NAND gate 940 is connected at its output side to lead 938. The inputs to NAND gate 940 are connected to lead 44 for receiving a pulse corresponding to the first transition of the first pulse of the second Baudot character, the second input is connected to lead 266 which receives the signal only when the incoming message on line 10a is in Baudot code while the other three inputs are connected to the inverted outputs $\bar{4}$, $\bar{2}$ and $\bar{1}$ of the bit counting flip-flops 353, 352 and 351 (FIG. 8), respectively. Accordingly, a signal is generated on line 938 to set flip-flop 61 at the beginning of the second Baudot character. Also flip-flop 61 is set to start the clock by a third input to OR gate 56 connected to lead 664 (FIG. 8) to receive a signal to start the clock at the beginning of the "dumping mode."

Further, the clock is stopped by resetting flip-flop 61 by a signal on one input to OR gate 274 connected to lead 668 (FIG. 8) which receives a pulse at the end of the "dump mode." Also, flip-flop 61 is reset by a signal received on the second input of OR gate 274 connected to lead 675 to receive a pulse at the end of the "fill mode."

The signal on lead 668 from delay multivibrator 667 as energized by the dump flip-flop 660 is connected to: (1) reset the counter chain flip-flop 72a to 72m by a connection to one input of clock reset generator 278; (2) reset flip-flop 96 to 104 and 150 to 158; (3) reset bit counters 351, 352 and 353; and (4) reset character counters 449, 450, 452, 453, 454, 456, 458 and 460. Also, the counter chain flip-flop 72a to 72m are reset by another input to clock reset generator 278 connected to lead 285 which generates the standard dump bit rate of either 100 Baudot or 600 Fieldata.

As explained hereinbefore, a signal on lead 40 in FIG. 1a is to be delayed relative to the transitions at the beginning and end of the dump mode by 200 microseconds. This is necessary so that such transitions are not mistaken by the detection circuitry as message transitions. Accordingly a pair of delay multivibrators 970 and 971 in FIG. 8, each having a pulse width of 200 microseconds and each responsive only to positive transitions, are connected at their output sides to lead 40 while their input sides are connected to the "set" and "reset" outputs, respectively, of flip-flop 670.

As explained hereinbefore, gate 16 in FIG. 1a is to be in an "open" state during fill mode. Since such gate should be in a "closed" state during dump mode, lead 20 is connected to the "reset" output of dump flip-flop 660.

For locking out gate 50 in FIG. 1a and thereby assuring that there is only one "start of sequence pulse" on line 58, lead 52 is connected through an inverter 972 in FIG. 14 to line 848. Accordingly, gate 50 is locked out 1 count after the first (and only) start of sequence pulse on 58.

Any message or electrical disturbance is considered as a "non-member" and is to be rejected if either (A) the time interval between the first transition (C in FIG. 3) and the second transition (d in FIG. 3) is greater than 424 counts so as not to eliminate 75 Baudot or (B) the second transition falls between the intervals: 1 to 8, 10 to 16, 20 to 22, 26 to 32, 40 to 44, 52 to 64, 80 to 128, 160 to 176, 208 to 256, or 320 to 352 (that is to say, not in the detection gate intervals on lines 130 to 138 and 160 to 168).

As to condition (A), gate 142p connected to frequency divider 72g to 72m as shown in FIG. 1a identifies any code which has a bit rate slower than the bit rate for 75 Baudot code (nominal bit rate of 192 counts) as a "non-member" code on its output lead 260 which has a gate generated thereon of 424 to 432 counts. Lead 260 is connected to one input of an OR gate 974 as shown in FIG. 1b. The output of OR gate 974 is connected to one input of an OR gate 975 by a lead 976. The output of OR gate 975 is connected to the input of a "non-member" flip-flop 977 by a lead 978. Flip-flop 977 is adjusted to go back automatically from "set" to "reset" in a predetermined time interval, such as 20 seconds. The reset output 979 of 977 is connected to one input of gate 182 in the "lock out" circuitry of FIG. 1a. Accordingly, the non-member signal is rejected for a short period of time and the channel equipment of FIG. 1a is then ready to accept a new message.

As to condition (B), lead 94 is connected to the other input of OR gate 974. As explained hereinbefore, a signal is generated on lead 265 to signify a "satisfactory initial detection accomplished" when one of the flip-flop 96 to 104 or 150 to 158 is set. Such signal on lead 265 "closes" gate 90 so quickly that a 10 microsecond pulse generated by delay multivibrator 24 is cut to less than 1 microsecond. Accordingly, output lead 976 is loaded by a capacitor (not shown) so that such small pulse will not "set" flip-flop 977. However, if the second transition (d in FIG. 4) does not "set" one of the flip-flops 96 to 104 or 150 to 158, such 10 microsecond pulse on line 94 will sufficiently energize lead 976 to set "non-member" flip-flop 977.

Since the first transition (c in FIG. 4) can appear on line 94, it is necessary to inhibit gate 975 for a short period of time. Therefore the second input of gate 974 is connected to lead 848 of FIG. 14 to inhibit it for 0 to 1 counts.

While there has been described and pointed out the fundamental novel features of the invention as applied to preferred embodiments, it will be understood that various omissions and substitutions and changes in the form and details of the devices illustrated and its operation may be made by those skilled in the art, without departing from the spirit of the invention.

What we claim is:

1. An automatic multichannel distribution central station which comprises a plurality of incoming message lines adapted to receive a message having informational bit pulses and address bit pulses, a plurality of outgoing message lines and channel equipment associated with each of said incoming message lines; said channel equipment comprising a master clock oscillator; a first means coupled to its said associated incoming line and said master clock oscillator for detecting the bit pulse rate of a message appearing on its said associated incoming message line; a second means coupled to said first means for generating a signal corresponding to the bit pulse rate of said message detected by said first means; a shift register; a third means coupling its said associated incoming line and said second means to said shift register for selectively transferring said informational bit pulses from its said associated incoming message line into said shift register; a message storage means; a fourth means coupling said shift register to said message storage means for selectively transferring a group of said informational bit pulses from said shift register into and to fill said message storage means; a fifth means for determining when said message storage means is filled with said groups of said informational bit pulses; a sixth means coupled to said shift register for storing said address bit pulses containing intelligence as to which said outgoing line is to receive said informational bit pulses appearing on its said associated incoming line; a seventh means coupled to said sixth means for determining whether the outgoing line corresponding to said address bit pulses is available; an eighth means controlled by said fifth and seventh means and coupling said message storage means to said shift register for dumping said groups of informational bit pulses from said message storage means back into said shift register when the outgoing line corresponding to said address bit pulses is available; and a ninth means coupling said shift register to the outgoing message line corresponding to said address bit pulses.

2. An automatic multichannel distribution central station according to claim 1 wherein said signal of said second means is an early gate interval terminating at the nominal time corresponding to the bit pulse rate of said message detected by said first means, said terminating gate interval shifting said shift register while said third means is transferring said informational bit pulses from its said associated incoming message line into said shift register.

3. An automatic multichannel distribution central station according to claim 2 wherein said second means also generates a late gate interval terminating at a preselected time interval after the termination of said early gate interval, said first means detecting the bit pulse rate of a message appearing on its said associated incoming message line over the total time interval of said early and late gate intervals.

4. An automatic multichannel distribution central station according to claim 1 wherein said address bit pulses on its said associated incoming message line also contains intelligence as to whether another outgoing line is to receive a carbon copy of the outgoing message, wherein said sixth means stores said additional carbon copy address intelligence, wherein said seventh means additionally determines whether the outgoing carbon copy line is available and wherein said eighth means transfers said group of informational bit pulses only when both the outgoing carbon copy line and the addressed outgoing message lines are available.

5. An automatic multichannel distribution central station according to claim 4 including a tenth means coupling said shift register to said outgoing carbon copy message line.

6. An automatic multichannel distribution central station according to claim 5 wherein said tenth means is a manual switch.

7. An automatic multichannel distribution central station according to claim 1 wherein said third means transfers said informational bit messages in serial arrangement from its said associated incoming message line into said shift register, said fourth means transfers a group of said bit pulses from said shift register in a parallel arrangement into said message storage means, said eighth means transfers said group of informational bit pulses from said message storage means in parallel arrangement back into said shift register and said ninth means transfers said informational bit pulses from said shift register in serial form to the outgoing message line corresponding to said address bit pulses.

8. An automatic multichannel distribution central station according to claim 1 wherein said first means includes first circuit means coupled to said master clock oscillator and its associated incoming message line for generating a plurality of speed detection gating intervals all starting simultaneously with the occurrence of a first transition of a first pulse of a message appearing on its said associated incoming line, second circuit means coupled at its input side to said associated incoming message line for providing a signal upon an occurrence of a second transition of said first pulse on said associated incoming line and third circuit means coupled to said first circuit and second circuit means for detecting coincidence between one of the generated gating intervals of said first circuit means and the output of said second circuit means.

9. An automatic multichannel distribution central station according to claim 8 wherein said first circuit means includes a plurality of frequency dividers connected in series to said master clock oscillator, a plurality of detection coincidence gates selectively coupled at their input sides to said plurality of frequency dividers for generating said plurality of detection gating intervals, a lock-out circuit means connected between said plurality of frequency dividers and said plurality of detection coincidence gates for preventing cyclic reoccurrence of generated gating intervals at the output sides of said plurality of detection coincidence gates, said second circuit means includes a plurality of bistable flip-flops each having a signal input and an enabling input, the enabling inputs of said plurality of flip-flops being selectively connected to the output sides of said plurality of detection coincidence gates while the signal input sides of said plurality of bistable flip-flops are connected to said second circuit means.

10. An automatic multichannel distribution central station according to claim 1 including an eleventh means for disabling said first means when said eighth means is dumping said groups of informational bit pulses from said message storage means into said shift register.

11. An automatic multichannel distribution central station according to claim 9 including a twelfth means for resetting said plurality of frequency dividers at the bit rate of said message appearing on its said associated incoming message line.

12. An automatic multichannel distribution central station according to claim 9 wherein said second means includes at least another plurality of coincidence gates se'ectively connected at their input sides to the said plurality of frequency dividers.

13. An automatic multichannel distribution central station according to claim 1 wherein said fifth means includes a character counter which determines when said message storage means is filled by counting said groups of bit pulses transferred therein.

14. An automatic multichannel distribution central station according to claim 13 wherein said character counter also counts said groups of said informational bit pulses upon the selected outgoing message line corresponding to said address bit pulses and wherein said eleventh means removes the disability of said first means when said character counter indicates that said message storage means is empty.

15. An automatic multichannel distribution central station according to claim 4 wherein said master clock oscil'ator is common to a plurality of said channel equipments, wherein said message storage means is selectively sectiond to separately store the messages appearing on each of said plurality of incoming message lines and wherein there is provided time sharing means including a channel access encoder common to said plurality of incoming message lines for sequentially transferring said groups of informational bit pulses from each of the shift registers associated with each of said channel equipments into a selected section of said message storage means and sequentially dumping said groups of informational bit pulses from its associated section of said message storage means back into its said associated shift register.

16. An automatic multichannel distribution central station according to claim 15 wherein said time sharing means includes a data input funnel means connected at its input side to each of said shift registers of each of said channel equipments and at its output side to said message storage means.

17. An automatic multichannel distribution central station according to claim 16 wherein said time sharing means includes a word locaion funnel means which routes said groups of said informational bit pulses from the output side of said data input funnel means to an assigned section of said message storage means.

18. An automatic multichannel distribution central station according to claim 17 wherein said time sharing means includes a data output funnel means connected at its input side to the output side of said message storage means and at its output side to said shift registers in the said channel equipments.

19. An automatic multichannel distribution central station according to claim 18 wherein said time sharing means includes a load/unload funnel means coupled to and controlling each section of said message storage means so that each section is either filling with or dumping said groups of informational bit pulses.

20. An automatic multichannel distribution central station according to claim 19 wherein said data input funnel means, said word location funnel means, said data output funnel means and said load/unload funnel means are controlled and synchronized by said channel access encoder.

21. An automatic multichannel distribution central station according to claim 15 wherein said ninth means includes an encoder for each of said channel equipments, each of said encoders being connected at its input side to its associated sixth means, a plurality of OR gates each of which is connected at its output side to one of said plurality of outgoing message lines, the inputs to the first OR gate being connected in turn to the first output of each of said encoders, the inputs to the second gate being connected to the second inputs of each of said encoders and the inputs to the $n$th gate being connected to the $n$th terminal of each of the encoders and wherein said tenth means includes a plurality of coincidence gates corresponding to the number of said incoming message lines, one input of each coincidence gates being coupled to one of the sixth means in each of said channel equipments for determining when a carbon copy is to be sent, the other input of each of the coincidence gates being coupled to a shift register in one of said channel equipments and a multiposition selector switch connected to the output of each of said coincidence gates, each terminal of said multiposition selector switch being connected to one input of one of said OR gates.

22. An automatic multichannel distribution central station according to claim 16 wherein said data input funnel comprises a plurality of groups of coincidence gates, the inputs to each group being connected to a shift register in one of said channel equipments and one output of said of said channel access encoder, the output of one coincidence gate in each of said groups being connected by separate lines to said message storage means.

23. An automatic multichannel distribution central station according to claim 17 wherein said word location funnel means includes a plurality of groups of concidence gates, the input side of each group of coincidence gates being connected to a character counter in one of said channel equipments and one terminal of said channel access encoder, one coincidence gate from each of said groups being conected at their output sides to one input terminal of said message storage means, and wherein there is provided a binary number counter means connected to the input side of said message storage means for repeatedly counting one to the number of said channel equipments.

24. An automatic multichannel distribution central station according to claim 18 wherein said data output funnel means comprises a plurality of groups of coincidence gates, each group of coincidence gates at their input sides being connected to the output side of said message storage means, said load/unload funnel means, and one terminal of said channel access encoder, the outputs of each coincidence gate from each group being connected to one shift register of each of said channel equipments.

25. An automatic multichannel distribution central station according to claim 19 wherein said load/unload funnel means includes a first group of a plurality of coincidence gates each connected at its input side to one terminal of said channel access encoder and the character counter in its said channel equipments, a delay multivibrator connected to the output of each coincidence gate of said first group, a second group of a plurality of coincidence gates, a third group of a plurality of coincidence gates, a third group of a plurality of coincidence gates, the first coincidence gates in said second and third groups being connected at their input sides to one of said delay multivibrators and the $n$th gates in said second and third groups of coincidence gates being connected to the $n$th multivibrator, means connected to the input side of said second plurality of coincidence gates which generate a signal when said message storage means is filling and means connected to the input side of said third group of coincidence gates which generates a signal when said message storage means is dumping information message bits from said message storage means.

26. An automatic multichannel distribution central station according to claim 1 wherein said eighth means includes at least one standard pulse generator coupled to said shift register for establishing the bit rate of said dumped groups of informational bits.

27. An automatic multichannel distribution central station which comprises a plurality of incoming message lines adapted to receive a message having informational bit pulses and address bit pulses, a plurality of outgoing message lines and channel equipment associated with each of said incoming message lines, said channel equipment comprising a master clock oscillator; a first means coupled to said master clock oscillator and its said associated incoming message line for generating a plurality of speed detection gating intervals all starting simultaneously with the occurrence of a first transition of a first pulse of a message on its said associated incoming line; a second means coupled at its input side to its said associated incoming message line for providing a signal upon the occurrence of a second transition of said first pulse on its said associated incoming line; a third means coupled to said first and second means for detecting coincidence between one of the generated gating intervals of said first means and said second transition of said first pulse received on its said associated incoming message line; a fourth means for generating at least one standard outgoing message speed signal; a shift register having a bit rate shift input, a serial message input, a plurality of parallel message lines and a serial message output; a fifth means coupled to said master clock oscillator and to said third means for providing an early gate interval terminating at the nominal time bit rate of the speed of said message detected on its said associated incoming line and a late gate interval which terminates at a predetermined time interval after the nominal time spacing between said first and second transitions of said first pulse, of the message detected on its associated incoming line; a sixth means for coupling said serial message input of said shift register to its said associated incoming message line; a seventh means coupling said bit rate shift input of said shift register to said fifth means for shifting said shift register on the occurrence of the termination of the late gating interval of the message detected on its associated incoming line; a memory system; an eighth means coupling said plurality of parallel message lines of said shift register to said memory system for selectively storing the message appearing on its said associated incoming line and later selectively dumping the stored message back upon said plurality of parallel message lines of said shift register so that the stored message appears on said serial message output of said shift register; a ninth means coupled to said shift register to store a predetermined number of address bits in a first prefatory character which appears on its said associated incoming line containing information as to which said outgoing line is to receive the informational bits appearing on its incoming message line; a tenth means for coupling said fourth means to said bit rate shift input of said shift register for shifting said shift register at at least one standard speed for outgoing messages and an eleventh means coupled between said serial message output of said shift register and all of the plurality of outgoing message lines, the eleventh means being controlled by the ninth means.

28. An automatic multichannel distribution central station according to claim 3 wherein said address bit pulses on its said associated incoming message line also contains intelligence as to whether another outgoing line is to receive a carbon copy of the outgoing message, wherein said sixth means stores the additional last-mentioned address intelligence, wherein said seventh means additionally determines whether the outgoing carbon copy line is available and wherein said eighth means transfers said group of informational bit pulses only when both the outgoing carbon copy line and the addressed outgoing message line are available.

29. An automatic multichannel distribution central station according to claim 28 including a tenth means coupling said shift register to said outgoing carbon copy message line.

30. An automatic multichannel distribution central station according to claim 29 wherein said tenth means is a manual switch.

31. An automatic multichannel distribution central station according to claim 30 wherein said third means transfers said informational bit messages in serial arrangement from its said associated incoming message line into said shift register, said fourth means transfers a group of said bit pulses from said shift register in a parallel arrangement into said message storage means, said eighth means transfers said group of informational bit pulses from said message storage means in parallel arrangement back into said shift register and said ninth means transfers said informational bit pulses from said shift register in serial form to the outgoing message line corresponding to said address bit pulses.

32. An automatic multichannel distribution central station according to claim 31 wherein said first means includes first circuit means coupled to said master clock oscillator and its said associated incoming message line for generating a plurality of speed detection gating intervals all starting simultaneously with the occurrence of a first transition of a first pulse of a message appearing on its said associated incoming line, second circuit means coupled at its input side to said associated incoming message line for providing a signal upon an occurrence of a second transition of said first pulse on said associated incoming line and third circuit means coupled to said first circuit and second circuit means for detecting coincidence between one of the generated gating intervals of said first circuit means and the output of said second circuit means.

33. An automatic multichannel distribution central station according to claim 32 wherein said first circuit means includes a plurality of frequency dividers connected in series to said master clock oscillator, a plurality of detection coincidence gates selectively coupled at their input sides to said plurality of frequency dividers for generating said plurality of detection gating intervals, a lock-out circuit means connected between said plurality of frequency dividers and said plurality of detection coincidence gates for preventing cyclic reoccurrence of generated gating intervals at the output sides of said plurality of detection coincidence gates and a plurality of bistable flip-flops having a signal input and an enabling input, the enabling inputs of said plurality of flip-flops being selectively connected to the output sides of said plurality of detection coincidence gates while the signal input sides of said plurality of bistable flip-flops are connected to said second circuit means.

34. An automatic multichannel distribution central station according to claim 33 including an eleventh means for disabling said first means when said eighth means is dumping said groups of informational bit pulses from said message storage means into said shift register.

35. An automatic multichannel distribution central station according to claim 34 including a twelfth means for resetting said plurality of frequency dividers at the bit rate of said message appearing on its said associated incoming message line.

36. An automatic multichannel distribution central station according to claim 35 wherein said second means includes at least another plurality of coincidence gates selectively connected at their input sides to the said plurality of frequency dividers.

37. An automatic multichannel distribution central station according to claim 36 wherein said fifth means includes a character counter which determines when said message storage means is filled by counting said groups of bit pulses transferred therein.

38. An automatic multichannel distribution central station according to claim 37 wherein said character counter also counts said groups of said informational bit pulses upon the selected outgoing message line corresponding to said address bit pulses and wherein said eleventh means removes the disability of said first means when said character counter indicates that said message storage means is empty.

39. An automatic multichannel distribution central station according to claim 38 wherein said master clock oscillator is common to a plurality of said channel equipments, wherein said message storage means is selectively sectioned to separately store the messages appearing on each of said plurality of incoming message lines and wherein there is provided time sharing means including a channel access encoder common to said plurality of incoming message lines for sequentially transferring said groups of informational bit pulses from each of the shift registers associated with each of said channel equipments into a selected section of said message storage means and sequentially dumping said groups of informational bit pulses from its associated section of said message storage means back into its said associated shift register.

40. An automatic multichannel distribution central station according to claim 39 wherein said time sharing means includes a data input funnel means connected at its input side to each of said shift registers of each of said channel equipments and at its output side to said message storage means.

41. An automatic multichannel distribution central station according to claim 40 wherein said time sharing means includes a word location funnel means which routes said groups of said informational bit pulses from the output side of said data input funnel means to an assigned section of said message storage means.

42. An automatic multichannel distribution central station according to claim 41 wherein said time sharing means includes a data output funnel means connected at its input side to the output side of said message storage means and at its output side to said shift registers in the said channel equipments.

43. An automatic multichannel distribution central station according to claim 42 wherein said time sharing means includes a load/unload funnel means coupled to and controlling each section of said message storage means so that each section is either filling with or dumping said groups of informatinal bit pulses.

44. An automatic multichannel distribution central station according to claim 43 wherein said data input funnel means, said word location funnel means, said data output funnel means and said load/unload funnel means are controlled and synchronized by said channel access encoder.

45. An automatic multichannel distribution central station according to claim 44 wherein said ninth means includes an encoder for each of said channel equipments, each of said encoders being connected at its input side to its associated sixth means, a plurality of OR gates each of which is connected at its output side to one of said plurality of outgoing message lines, the inputs to the first OR gate being connected in turn to the first output of each of said encoders, the inputs to the second gate being connected to the second inputs of each of said encoders and the inputs to the $n$th gate being connected to the $n$th terminal of each of the encoders and wherein said tenth means includes a plurality of coincidence gates corresponding to the number of said incoming message lines, one input of each coincidence gates being coupled to one of the sixth means in each of said channel equipments for determining when a carbon copy is to be sent, the other input of each of the coincidence gates being coupled to a shift register in one of said channel equipments and a multiposition selector switch connected to the output of each of said coincidence gates, each terminal of said multiposition selector switch being connected to one input of one of said OR gates.

46. An automatic multichannel distribution central station according to claim 45 wherein said eighth means includes at least one standard pulse generator coupled to said shift register for establishing the bit rate of said dumped groups of informational bits.

References Cited

UNITED STATES PATENTS 3,141,928    7/1964    Davey et al.
3,288,919    11/1966    Abbott et al.

THOMAS A. ROBINSON, *Primary Examiner.*

U.S. CL. X.R.

178—17.5